(12) United States Patent
Kim et al.

(10) Patent No.: US 11,678,168 B2
(45) Date of Patent: Jun. 13, 2023

(54) METHOD AND APPARATUS FOR EFFICIENTLY CONTROLLING ACCESS FOR SYSTEM LOAD ADJUSTMENT IN MOBILE COMMUNICATION SYSTEMS

(71) Applicant: Samsung Electronics Co., Ltd., Suwon-si (KR)

(72) Inventors: Sang Bum Kim, Suwon-si (KR); Kyeong In Jeong, Suwon-si (KR); Soeng Hun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/548,324

(22) Filed: Dec. 10, 2021

(65) Prior Publication Data

US 2022/0141638 A1  May 5, 2022

Related U.S. Application Data

(63) Continuation of application No. 16/693,122, filed on Nov. 22, 2019, now Pat. No. 11,202,186, which is a (Continued)

(51) Int. Cl.
*H04W 4/90* (2018.01)
*H04W 76/50* (2018.01)
(Continued)

(52) U.S. Cl.
CPC ......... *H04W 4/90* (2018.02); *H04W 28/0247* (2013.01); *H04W 48/06* (2013.01); *H04W 76/50* (2018.02)

(58) Field of Classification Search
CPC ....... H04W 48/12; H04W 48/16; H04W 4/90; H04W 76/50; H04W 28/0289;
(Continued)

(56) References Cited

U.S. PATENT DOCUMENTS 6,370,390 B1   4/2002   Salin et al.
7,953,034 B2   5/2011   Lee et al.
(Continued)

FOREIGN PATENT DOCUMENTS

CN    1229562 A    9/1999
CN    1524392 A    8/2004
(Continued)

OTHER PUBLICATIONS

Ericsson et al., "SMS over SGs usage to support NAS procedures for PS only Sms", SA WG2 Meeting #89, Feb. 6-10, 2011, 15 pages, S2-121108.
(Continued)

*Primary Examiner* — Allahyar Kasraian

(57) ABSTRACT

The present invention relates to a method and apparatus for efficiently controlling access for system load adjustment in mobile communication systems. A method for transmitting and receiving data by a terminal including a user equipment (UE) non access stratum (NAS) and a UE access stratum (AS) includes the steps of: receiving by the UE AE, information including emergency call-related information which includes barring information by type for the emergency call, from a base station; transmitting, by the UE NAS, a service request for the emergency call to the UE AS; and determining, by the UE AS, whether to bar the service request on the basis of emergency call-related information. During an emergency call transmission, network congestion can be easily controlled by enabling various types of emergency calls to be transmitted, and enabling access to be barred information according to the situation of a communication network and types of emergency calls.

16 Claims, 18 Drawing Sheets

Related U.S. Application Data continuation of application No. 14/375,119, filed as application No. PCT/KR2013/000667 on Jan. 28, 2013, now Pat. No. 10,531,264.

(60) Provisional application No. 61/595,646, filed on Feb. 6, 2012, provisional application No. 61/591,385, filed on Jan. 27, 2012.

(51) Int. Cl.
*H04W 28/02* (2009.01)
*H04W 48/06* (2009.01)

(58) Field of Classification Search
CPC ....... H04W 4/021; H04W 48/18; H04W 4/06; H04W 48/06; H04W 28/0247; H04W 48/08
See application file for complete search history.

(56) References Cited

U.S. PATENT DOCUMENTS

| | | | |
|---|---|---|---|
| 8,203,987 B2 | 6/2012 | Ishii et al. |
| 8,289,904 B2 | 10/2012 | Kim et al. |
| 8,638,705 B2 | 1/2014 | Park et al. |
| 8,649,288 B2 | 2/2014 | He et al. |
| 8,693,381 B2 | 4/2014 | Zhang et al. |
| 8,730,859 B2 | 5/2014 | Park et al. |
| 8,743,896 B2 | 6/2014 | Wu |
| 8,774,818 B2 | 7/2014 | Lim et al. |
| 8,792,417 B2 | 7/2014 | Yeoum et al. |
| 8,838,046 B2 | 9/2014 | Fu et al. |
| 8,842,546 B2 | 9/2014 | Chen et al. |
| 8,868,081 B2 | 10/2014 | Heath et al. |
| 9,167,483 B2 | 10/2015 | Jang et al. |
| 9,173,167 B2 | 10/2015 | Somasundaram et al. |
| 9,220,028 B2 | 12/2015 | Suzuki et al. |
| 9,237,419 B2 | 1/2016 | Jung et al. |
| 9,398,551 B2 | 7/2016 | Fwu et al. |
| 9,668,177 B2 | 5/2017 | Grob-Lipski et al. |
| 10,779,349 B2 | 9/2020 | Kim et al. |
| 2001/0034235 A1 | 10/2001 | Froula |
| 2003/0223452 A1 | 12/2003 | Toskala et al. |
| 2004/0053623 A1 | 3/2004 | Hoff et al. |
| 2004/0146018 A1 | 7/2004 | Walton et al. |
| 2004/0147274 A1 | 7/2004 | Khawand et al. |
| 2004/0180675 A1 | 9/2004 | Choi et al. |
| 2004/0203775 A1 | 10/2004 | Bourdeaut et al. |
| 2005/0041608 A1 | 2/2005 | Jeong et al. |
| 2005/0111393 A1 | 5/2005 | Jeong et al. |
| 2006/0023664 A1 | 2/2006 | Jeong et al. |
| 2006/0058034 A1 | 3/2006 | Vaittinen et al. |
| 2006/0281466 A1 | 12/2006 | Gholmieh et al. |
| 2007/0019643 A1 | 1/2007 | Shaheen |
| 2007/0032251 A1 | 2/2007 | Shaheen |
| 2007/0213033 A1 | 9/2007 | Alper et al. |
| 2007/0268877 A1 | 11/2007 | Buckley et al. |
| 2007/0287419 A1 | 12/2007 | Wang |
| 2008/0220782 A1 | 9/2008 | Wang et al. |
| 2008/0240439 A1 | 10/2008 | Mukherjee et al. |
| 2009/0016266 A1 | 1/2009 | Kim et al. |
| 2009/0034452 A1 | 2/2009 | Somasundaram et al. |
| 2009/0170498 A1 | 7/2009 | Venkatasubramanian et al. |
| 2009/0186624 A1 | 7/2009 | Cave et al. |
| 2009/0238098 A1 | 9/2009 | Cai et al. |
| 2009/0247176 A1 | 10/2009 | Song et al. |
| 2009/0316637 A1 | 12/2009 | Yi et al. |
| 2009/0323608 A1 | 12/2009 | Adachi et al. |
| 2010/0041428 A1 | 2/2010 | Chen et al. |
| 2010/0075635 A1 | 3/2010 | Lim et al. |
| 2010/0093386 A1 | 4/2010 | Damnjanovic et al. |
| 2010/0099402 A1 | 4/2010 | Wu |
| 2010/0113010 A1 | 5/2010 | Tenny et al. |
| 2010/0118805 A1 | 5/2010 | Ishii |
| 2010/0144361 A1 | 6/2010 | Gholmieh et al. |
| 2010/0172280 A1 | 7/2010 | Guo et al. |
| 2010/0177831 A1 | 7/2010 | Kim et al. |
| 2010/0195643 A1 | 8/2010 | Kodali et al. |
| 2010/0202288 A1 | 8/2010 | Park et al. |
| 2010/0210255 A1 | 8/2010 | Amirijoo et al. |
| 2010/0210268 A1 | 8/2010 | Lim et al. |
| 2010/0226350 A1 | 9/2010 | Lim et al. |
| 2010/0255847 A1 | 10/2010 | Lee et al. |
| 2010/0278131 A1 | 11/2010 | Jeong et al. |
| 2010/0296409 A1 | 11/2010 | Fok et al. |
| 2010/0296467 A1 | 11/2010 | Pelletier et al. |
| 2010/0317356 A1 | 12/2010 | Roessel et al. |
| 2010/0322217 A1 | 12/2010 | Jin et al. |
| 2010/0330921 A1 | 12/2010 | Kim et al. |
| 2011/0003595 A1 | 1/2011 | Shan |
| 2011/0021197 A1 | 1/2011 | Ngai |
| 2011/0051609 A1 | 3/2011 | Ishii et al. |
| 2011/0058521 A1 | 3/2011 | Xu et al. |
| 2011/0085535 A1 | 4/2011 | Shaheen |
| 2011/0086635 A1 | 4/2011 | Grob-Lipski |
| 2011/0103328 A1 | 5/2011 | Lee et al. |
| 2011/0116433 A1 | 5/2011 | Dorenbosch |
| 2011/0158165 A1 | 6/2011 | Dwyer et al. |
| 2011/0158166 A1 | 6/2011 | Lee et al. |
| 2011/0170503 A1 | 7/2011 | Chun et al. |
| 2011/0183662 A1 | 7/2011 | Lee et al. |
| 2011/0188416 A1 | 8/2011 | Faccin et al. |
| 2011/0194505 A1 | 8/2011 | Faccin et al. |
| 2011/0195668 A1 | 8/2011 | Lee et al. |
| 2011/0199923 A1 | 8/2011 | Persson et al. |
| 2011/0249641 A1 | 10/2011 | Kwon et al. |
| 2011/0250910 A1 | 10/2011 | Lee et al. |
| 2011/0256884 A1 | 10/2011 | Kazmi et al. |
| 2011/0269447 A1 | 11/2011 | Bienas et al. |
| 2011/0299415 A1 | 12/2011 | He et al. |
| 2011/0312316 A1 | 12/2011 | Baldemair et al. |
| 2012/0014357 A1 | 1/2012 | Jung et al. |
| 2012/0020231 A1 | 1/2012 | Chen et al. |
| 2012/0040643 A1 | 2/2012 | Diachina et al. |
| 2012/0044898 A1 | 2/2012 | Ishii |
| 2012/0063300 A1 | 3/2012 | Sahin et al. |
| 2012/0064886 A1 | 3/2012 | Kim et al. |
| 2012/0082088 A1 | 4/2012 | Dalsgaard et al. |
| 2012/0088457 A1 | 4/2012 | Johansson et al. |
| 2012/0088509 A1 | 4/2012 | Yi |
| 2012/0092286 A1 | 4/2012 | O'Prey et al. |
| 2012/0096154 A1 | 4/2012 | Chen et al. |
| 2012/0113915 A1 | 5/2012 | Chen et al. |
| 2012/0113948 A1 | 5/2012 | Kwon et al. |
| 2012/0178456 A1 | 7/2012 | Peisa et al. |
| 2012/0218922 A1 | 8/2012 | Klingenbrunn et al. |
| 2012/0236776 A1 | 9/2012 | Zahng et al. |
| 2012/0276897 A1 | 11/2012 | Kwon et al. |
| 2012/0329458 A1 | 12/2012 | Hjelmgren et al. |
| 2013/0010711 A1 | 1/2013 | Larsson et al. |
| 2013/0039250 A1 | 2/2013 | Hsu |
| 2013/0040605 A1 | 2/2013 | Zhang et al. |
| 2013/0045765 A1 | 2/2013 | Laitinen et al. |
| 2013/0079017 A1 | 3/2013 | Mach et al. |
| 2013/0090142 A1 | 4/2013 | Lee et al. |
| 2013/0107778 A1 | 5/2013 | Ryu et al. |
| 2013/0121204 A1 | 5/2013 | Lee et al. |
| 2013/0122906 A1 | 5/2013 | Klatt |
| 2013/0163536 A1 | 6/2013 | Anderson et al. |
| 2013/0189978 A1 | 7/2013 | Lee et al. |
| 2013/0196604 A1 | 8/2013 | Jung et al. |
| 2013/0265866 A1 | 10/2013 | Yi et al. |
| 2013/0272139 A1 | 10/2013 | Guo et al. |
| 2013/0294293 A1 | 11/2013 | Iwai |
| 2013/0322302 A1 | 12/2013 | Gholmieh et al. |
| 2014/0023032 A1 | 1/2014 | Kim et al. |
| 2014/0023055 A1 | 1/2014 | Jeong et al. |
| 2014/0044074 A1 | 2/2014 | Chen et al. |
| 2014/0051429 A1 | 2/2014 | Jung et al. |
| 2014/0080531 A1 | 3/2014 | Du et al. |
| 2014/0086224 A1 | 3/2014 | Kwon et al. |
| 2014/0112254 A1 | 4/2014 | Lindoff et al. |
| 2014/0112276 A1 | 4/2014 | Ahn et al. |
| 2014/0128029 A1 | 5/2014 | Fong et al. |

(56) References Cited

U.S. PATENT DOCUMENTS

| | | |
|---|---|---|
| 2014/0169323 A1 | 6/2014 | Park et al. |
| 2014/0171096 A1 | 6/2014 | Hwang et al. |
| 2014/0219204 A1 | 8/2014 | Park et al. |
| 2014/0233516 A1 | 8/2014 | Chun et al. |
| 2014/0241285 A1 | 8/2014 | Pang et al. |
| 2014/0242974 A1 | 8/2014 | Lee et al. |
| 2015/0044972 A1 | 2/2015 | Lee et al. |
| 2015/0063305 A1 | 3/2015 | Kim et al. |
| 2015/0111520 A1 | 4/2015 | Hsu |
| 2015/0245261 A1 | 8/2015 | Teyeb et al. |
| 2016/0050652 A1 | 2/2016 | Wu et al. |

FOREIGN PATENT DOCUMENTS

| | | | | |
|---|---|---|---|---|
| CN | 1671240 | A | 9/2005 | |
| CN | 1738486 | A | 2/2006 | |
| CN | 1829380 | A | 9/2006 | |
| CN | 101242608 | A | 8/2008 | |
| CN | 101426256 | A | 5/2009 | |
| CN | 101668250 | A | 3/2010 | |
| CN | 101682896 | A | 3/2010 | |
| CN | 101772928 | A | 7/2010 | |
| CN | 101841889 | A | 9/2010 | |
| CN | 102027798 | A | 4/2011 | |
| CN | 102098655 | A | 6/2011 | |
| CN | 102123516 | A | 7/2011 | |
| CN | 102150454 | A | 8/2011 | |
| CN | 102170644 | A | 8/2011 | |
| CN | 102238754 | A | 11/2011 | |
| CN | 102300203 | A | 12/2011 | |
| CN | 103188764 | A * | 7/2013 | ............... H04Q 7/38 |
| EP | 0946071 | A2 | 9/1999 | |
| EP | 2469939 | A1 | 6/2012 | |
| EP | 2693826 | A1 | 2/2014 | |
| GB | 2443233 | A * | 4/2008 | ............ H04W 48/06 |
| GB | 2461780 | A | 1/2010 | |
| JP | 2013135386 | A | 7/2013 | |
| KR | 10-2005-0015729 | A | 2/2005 | |
| KR | 10-2005-0032953 | A | 4/2005 | |
| KR | 10-2009-0019868 | A | 2/2009 | |
| KR | 10-2010-0017513 | A | 2/2010 | |
| KR | 10-2010-0034885 | A | 4/2010 | |
| KR | 10-2010-0051906 | A | 5/2010 | |
| KR | 1020100105449 | A | 9/2010 | |
| KR | 10-2010-0135679 | A | 12/2010 | |
| KR | 10-2010-0139098 | A | 12/2010 | |
| KR | 10-2011-0000482 | A | 1/2011 | |
| KR | 10-2011-0010100 | A | 1/2011 | |
| KR | 1020110000479 | A | 1/2011 | |
| KR | 10-2011-0049622 | A | 5/2011 | |
| KR | 10-2011-0091305 | A | 8/2011 | |
| KR | 1020110093642 | A | 8/2011 | |
| RU | 2262811 | C2 | 10/2005 | |
| RU | 2411697 | C2 | 4/2009 | |
| RU | 2009120480 | A | 12/2010 | |
| WO | 98/01004 | A2 | 1/1998 | |
| WO | 98/26625 | A2 | 6/1998 | |
| WO | 2008/024788 | A2 | 2/2008 | |
| WO | 2008/137354 | A1 | 11/2008 | |
| WO | 2010/121662 | A1 | 10/2010 | |
| WO | 2010/124228 | A2 | 10/2010 | |
| WO | 2010/125969 | A1 | 11/2010 | |
| WO | 2011/007985 | A3 | 4/2011 | |
| WO | 2011/038625 | A1 | 4/2011 | |
| WO | 2011085802 | A1 | 7/2011 | |
| WO | 2011/093666 | A2 | 8/2011 | |
| WO | 2011093666 | A2 | 8/2011 | |
| WO | 2011133934 | A1 | 10/2011 | |
| WO | 2011/158779 | A1 | 12/2011 | |
| WO | 2011154761 | A1 | 12/2011 | |
| WO | 2012/108811 | A1 | 8/2012 | |
| WO | 2012/141483 | A2 | 10/2012 | |
| WO | 2013/020582 | A1 | 2/2013 | |
| WO | 2013/051836 | A1 | 4/2013 | |
| WO | 2013/051912 | A2 | 4/2013 | |
| WO | 2013/065995 | A1 | 5/2013 | |

OTHER PUBLICATIONS

Huawei, HiSilicon, "Enabling SMS for PS-only", SA WG2 Meeting #87, Oct. 10-14, 2011, 8 pages, S2-114186.

Huawei et al., "Support for Enhanced UE Battery Saving", SA WG2 Meeting #89, Feb. 6-10, 2012, 40 pages, S2-120715.

"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.4.0 (Dec. 2011), 296 pages.

Office Action dated Dec. 17, 2018 in connection with Japanese Patent Application No. 2018-073713, 9 pages.

Office Action dated Jan. 3, 2019 in connection with Korean Patent Application No. 10-2013-0002455, 7 pages.

Office Action dated Dec. 20, 2018 in connection with Korean Patent Application No. 10-2013-0012964, 12 pages.

Office Action dated Dec. 15, 2018 in connection with Korean Patent Application No. 10-2014-7028047, 8 pages.

Supplementary European Search Report dated Oct. 27, 2015 in connection with European Patent Application No. 13741031.2, 6 pages.

3GPP TS 22.011 v11.2.0; "Service accessibility"; Release 11; Dec. 1, 2011; 26 pages.

3GPP TSG-RAN WG2 #75; "EAB model in UE"; R2-114456; Athens, Greece, Aug. 22-26, 2011; 4 pages.

3GPP TSG-RAN WG2 #75; "General consideration of EAB in LTE"; R2-113988; Athens, Greece, Aug. 22-26, 2011 4 pages.

Extended European Search Report issued for EP 13741031.2 dated Mar. 9, 2016, 13 pgs.

Samsung, "EAB Parameter for RAN Sharing", R2-120783, 3GPP TSG RAN WG2 #77, Jan. 31, 2012, 2 pgs.

Huawei et al., "EAB Parameters in Shared Network", R2-115830, 3GPP TSG-RAN WG2 Meeting #76, Nov. 8, 2011, 2 pgs.

European Search Report dated Nov. 19, 2018 in connection with European Patent Application No. 18 18 6199, 9 pages.

Office Action dated Sep. 13, 2018 in connection with Korean Patent Application No. 10-2012-0140229, 12 pages.

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 v10.2.0 (Jun. 2011), Jun. 28, 2011, 54 pages.

Samsung, "PS-only high level function description", 3GPP TSG SA WG2 Meeting #89, Feb. 6-10, 2012, 3 pages, TD S2-110485.

Research in Motion Ltd., "Go to Long Sleep Command for LTE DRX", 3GPP TSG-RAN-WG2 Meeting #61 bis, Mar. 31-Apr. 4, 2008, 4 pages, R2-081868.

European Patent Office Communication regarding Application No. 12826373.8, dated Apr. 13, 2018, 7 pages.

LG Electronics Inc., "FGI bit 25", 3GPP TSG-RAN WG2 #74 (R2-113277), May 2011, 3 pages.

"3rd Generation Partnership Project; Technical Specification Group Radio Access Network; Evolved Universal Terrestrial Radio Access (E-UTRA); User Equipment (UE) radio transmission and reception (Release 10)", 3GPP TS 36.101 V.10.3.0, Jun. 2011, 237 pages.

Communication from a foreign patent office in a counterpart foreign application, Australian Application No. 2017200065, Examination report No. 1 for standard patent application, dated Jan. 10, 2018, 3 pages.

Communication from a foreign patent office in a counterpart foreign application, Japanese Application No. 2016-223589, Text of Notice of Reasons for Refusal, dated Dec. 25, 2017, 8 pages.

Communication from a foreign patent office in a counterpart foreign application, Russian Application No. 2016139252/07(062595), Text of Decision on Grant, dated Nov. 8, 2017, 15 pages.

CATT, "Analysis on FGIs for 3/4-mode UE," R2-121173, 3GPP TSG RAN WG2 Meeting #77bis, Jeju, Korea, Mar. 26-30, 2012, 3 pages.

(56) References Cited

OTHER PUBLICATIONS

CATT, "Corrections and Clarifications on UTRA related FGIs," R2-121549, 3GPP TSG-RAN2 Meeting #77bis, Jeju, Korea, Mar. 26-20, 2012, 8 pages.
CATT, "Corrections and Clarifications on UTRA related FGIs," R2-121551, 3GPP TSG-RAN2 Meeting #77bis, Jeju, Korea, Mar. 26-30, 2012, 10 pages.
Communication from a foreign patent office in a counterpart foreign application, IP Australia, "Examination report No. 1 for standard patent application," Application No. AU 2017203059, dated Jun. 5, 2018, 8 pages.
Communication from a foreign patent office in a counterpart foreign application, Canadian Intellectual Property Office, Office Action in connection with Application No. CN 2,845,779, dated Jun. 7, 2018, 4 pages.
Communication from a foreign patent office in a counterpart foreign application, European Patent Office, "European Search Report," Application No. EP 18160008.1, dated Jun. 7, 2018, 11 pages.
3GPP TS 36.321 V11.0.0 (Sep. 2012), Technical Specification, 3rd Generation Partnership Project; Technical Specification Group Radio Access Network; Evolved Universal Terrestrial Radio Access (E-UTRA); Medium Access Control (MAC) protocol specification (Release 11), 55 pages.
Ericsson, et al., "Multiple frequency band indicators per cell," R2-114301, 3GPP TSG-RAN2 Meeting #75, Athens, Greece, Aug. 22-26, 2011, 8 pages.
Interdigital, "RACH with Carrier Aggregation," Tdoc R2-102132, 3GPP TSG-RAN WG2 #69bis, Beijing, P.R. China, Apr. 12-16, 2010, 3 pages.
International Search Report dated May 9, 2013 in connection with International Patent Application No. PCT/KR2013/000667, 6 pages.
Written Opinion of International Searching Authority dated May 9, 2013 in connection with International Patent Application No. PCT/KR2013/000667, 6 pages.
ETSI TS 122 011 V10.3.0, "Digital Cellular Telecommunications System (Phase 2+); Universal Mobile Telecommunications System (UMTS); LTE, Service Accessibility (3GPP TS 22 011 version 10.3.0 Release 10)", Apr. 2011, 26 pages.
LG Electronics Inc., "Further Discussion on EAB", R2-113339, 3GPP TSG-RAN WG2#74, Barcelona, Spain, May 13, 2011, 5 pages.
"3rd Generation Partnership Project; Technical Specification Group Radio Access Network Extending 850MHz Study Item Technical Report (Release 9)," 3GPP TR 37.806, V1.1.0, Aug. 2011, 77 pages.
"3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimization of Drive Tests (MDT); Overall Description; Stage 2 (Release 10)," 3GPP TS 37.320, V10.4.0, Dec. 2011, 18 pages.
"Multiple Frequency Band Indicators per Cell," 3GPP TSG-RAN WG2 #75, Tdoc R2-114299, Ericsson and ST Ericsson, Athens, Greece, Aug. 22-26, 2011, 5 pages.
"The MDT Applicability of EPLMN," 3GPP TSG-WG2 Meeting #75, R2-114011, Huawei and HiSilicon, Athens, Greece, Aug. 22-26, 2011, 16 pages.
"3rd Generation Partnership Project; Technical Specification Group Radio Access Network; Evolved Universal Terrestrial Radio Access (E-UTRA); Radio Resource Control (RRC); Protocol Specification (Release 10)," 3GPP TS 36.331, V10.2.0, Jun. 2011, 9 pages.
Foreign Communication From a Related Counterpart Application, Australian Application No. 2013208385, Examination Report No. 3 for Standard Patent Application dated Dec. 21, 2016, 6 pages.
Foreign Communication From a Related Counterpart Application, Chinese Application No. 201280040843.3, Text of the First Office Action dated Dec. 8, 2016, 17 pages.
Foreign Communication From a Related Counterpart Application, Chinese Application No. 201280049785.0, Text of the Second Office Action dated Dec. 28, 2016, 12 pages.

Foreign Communication From a Related Counterpart Application, Russian Application No. 2014127861, Decision on Grant dated Nov. 28, 2016, 13 pages.
"3rd Generation Partnership Project; Technical Specification Group Radio Access Network; Study on Minimization of Drive Tests in Next Generation Networks (Release 9)," 3GPP TS 36.805, V.9.0.0, Dec. 2009, 24 pages.
"RACH and Carrier Aggregation," 3GPP TSG-RAN WG2 Meeting #68, R2-096844, Nokia Corporation, Nokia Siemens Networks, Jeju, South Korea, Nov. 9-13, 2009, 3 pages.
Final Office Action dated Dec. 17, 2021, in connection with U.S. Appl. No. 16/676,138, 18 pages.
Huawei, Hisilicon, "Enabling SMS for PS-only," SA WG2 Meeting #87, S2-114586, Jeju, Korea, Oct. 10-14, 2011, 3 pages.
Huawei, Hisilicon, "Enabling SMS for PS-only," SA WG2 Meeting #87, S2-114586 (previously 446186), Jeju, Korea, Oct. 10-14, 2011, 3 pages.
Alcatel, Huawei, Hisilicon, "VLR SGs paging retry," SA WG2 Meeting #87, S2-114636, Jeju, Korea, Oct. 10-14, 2011, 5 pages.
3GPP TS 23.272 V10.5.0 (Sep. 2011), 3rd General Partnership Project; Technical Specification Group Services and System Aspects, Circuit Switched (CS) fallback in Evolved Packet System (EPS); Stage 2 (Release 10), 79 pages.
Samsung, "RRC TP on CA changes regarding Connection control," 3GPP TSG-RAN2#70 bis meeting,Tdoc R2-103802, Stockholm, Sweden, Jun. 28-Jul. 2, 2010, 19 pages.
ZTE, "Some small corrections to 36.300," 3GPP TSG-RAN WG2 Meeting #74, R2-113388, Barcelona, Spain, May 9-13, 2011, 9 pages.
Pantech, "IDC trigger procedure," 3GPP TSG-RAN WG2 Meeting #77, R2-120664, Dresden, Germany, Nov. 14-18, 2011, 5 pages.
Ericsson, St-Ericsson, "Accessibility measurements for MDT," 3GPP TSG-RAN WG2 #76, Tdoc R2-116148, San Francisco, CA, Oct. 14-18, 2011, 3 pages.
Motorola, "Solution for Extra Low Power Consumption & Time Controlled," 3GPP TSG SA WG2 Meeting #78, TD S2-101215, San Francisco, CA, Feb. 22-26, 2010, 3 pages.
Alcatel-Lucent, et al., "RA procedure on SCell," TSG-RAN WG2#77, R2-120603, Dresden, Germany, Feb. 6-10, 2012, 5 pages.
Foreign Communication from a Related Counterpart Application, Chinese Application No. 201280068812.9, Text of the First Office Action dated Apr. 19, 2017, 13 pages.
Foreign Communication from a Related Counterpart Application, Chinese Application No. 201380018207.5, Text of the First Office Action dated May 12, 2017, 10 pages.
Foreign Communication from a Related Counterpart Application, Chinese Application No. 201380010349.7, Text of the First Office Action dated May 31, 2017, 14 pages.
Foreign Communication from a Related Counterpart Application, Chinese Application No. 201380005093.0, Text of the First Office Action dated Jun. 2, 2017, 16 pages.
Foreign Communication from a Related Counterpart Application, Chinese Application No. 201380017677.X, Text of the First Office Action dated Jun. 13, 2017, 16 pages.
Foreign Communication from a Related Counterpart Application, Chinese Application No. 201380018209.4, Text of the First Office Action dated Jun. 22, 2017, 15 pages.
Foreign Communication from a Related Counterpart Application, Chinese Application No. 201380016921.0, Text of the First Office Action dated Jun. 26, 2017, 24 pages.
Foreign Communication from a Related Counterpart Application, Japanese Application No. 2014-545820, Notice of Reasons for Refusal dated May 25, 2017, 9 pages.
Foreign Communication from a Related Counterpart Application, Japanese Application No. 2014-551202, Notice of Reasons for Refusal dated May 30, 2017, 6 pages.
LG Electronics Inc., "Capability indication of handover support between LTE FDD and LTE TDD", 3GPP TSG-RAN WG2 Meeting #74, Apr. 9-14, 2011, 7 pages, R2-113282.
Nokia Corporation, Nokia Siemens Networks, "UE capability signaling for CA and MIMO in REL10", 3GPP TSG-RAN WG2 Meeting #72, Nov. 15-19, 2010, R2-106934.

(56) References Cited

OTHER PUBLICATIONS

HTC Corporation, "Correction to field descriptions of UE-EUTRA-Capability", 3GPP TSG-RAN2 Meeting #68bis, Jan. 18-22, 2010, 6 pages, R2-100769.
Office Action dated Jun. 6, 2019 in connection with Canadian Patent Application No. 2,859,499, 4 pages.
European Search Report dated Jul. 3, 2019 in connection with European Patent Application No. 19 16 5270, 10 pages.
Office Action dated Jun. 17, 2019 in connection with Korean Patent Application No. 10-2019-0068946, 7 pages.
Qualcomm Incorporated, "Separate UE capability for FDD and TDD", 3GPP TSG-RAN WG2 meeting #74, May 9-13, 2011, 3 pages, R2-113059.
Qualcomm Incorporated, "UE capability for FDD and TDD", 3GPP TSG-RAN WG2 meeting #73bis, Apr. 11-15, 2011, 3 pages, R2-111868.
Qualcomm Incorporated, "Introduction of UE capability for handover between FDD and TDD", 3GPP TSG-RAN WG2 meeting #74, May 9-13, 2011, 6 pages, R2-113056.
Ericsson et al., "Registration of MME for SMS", SA WG2 Meeting #93, Oct. 8-12, 2012, 12 pages, S2-124181.
Intel Corporation, "Configuration of multiple TA in Rel-11 CA", 3GPP TSG RAN2#74 meeting, May 9-13, 2011, 5 pages, R2-113215.
InterDigital Communications, "Support for multiple Timing Advance in LTE CA", 3GPP TSG-RAN WG2 #74, May 9-13, 2011, 5 pages, Tdoc R2-113255.
Huawei, HiSilicon, "Discussion on TA group management", 3GPP TSG-RAN WG2 Meeting #74, May 9-13, 2011, 4 pages, R2-113285.
NTT Docomo, "Further discussions on LTE-A UE categories/capabilities", 3GPP TSG-RAN WG4 Ad-hoc meeting #2010-04, Oct. 11-15, 2010, 5 pages, R4-103470.
Decision to Grant dated Mar. 11, 2019 in connection with Korean Patent Application No. 10-2012-0085793, 7 pages.
Decision to Grant dated Apr. 10, 2019 in connection with Korean Patent Application No. 10-2012-0112390, 7 pages.
Decision to Grant dated May 2, 2019 in connection with Korean Patent Application No. 10-2019-7009763, 7 pages.
Office Action dated Mar. 18, 2019 in connection with Korean Patent Application No. 10-2012-0087760, 8 pages.
Office Action dated Mar. 14, 2019 in connection with Korean Patent Application No. 10-2012-0140229, 16 pages.
Office Action dated Mar. 13, 2019 in connection with Korean Patent Application No. 10-2013-0004568, 8 pages.
Huawei, HiSilicon, "Consideration on coverage optimization", 3GPP TSG-RAN WG2 Meeting #76, Nov. 14-18, 2011, R2-115885, 2 pages.
Research in Motion UK Limited, "Interference measurement for BT", 3GPP TSG-RAN WG2 Meeting #77, Feb. 6-10, 2012, R2-120183, 6 pages.
Ericsson, ST-Ericsson, "Introduction of relays in MAC", 3GPP TSG-RAN WG2 Meeting #71, Aug. 23-27, 2010, R2-105210, 51 pages.
Texas Instruments, "Increasing Sounding Capacity for LTE-A", 3GPP TSG RAN WG1 #59bis, Jan. 18-22, 2010, R1-100745, 5 pages.
European Search Report dated Oct. 24, 2019 in connection with European Patent Application No. 19 17 9723, 6 pages.
Office Action dated Sep. 18, 2019 in connection with India Patent Application No. 3851/KOLNP/2013, 8 pages.
Notice of Allowance dated Sep. 5, 2019 in connection with Korean Patent Application No. 10-2013-0002595, 7 pages.
Notice of Allowance dated Sep. 18, 2019 in connection with Korean Patent Application No. 10-2013-0004568, 6 pages.
Office Action dated Oct. 23, 2019 in connection with Korean Patent Application No. 10-2012-0087760, 9 pages.
Extended European Search Report regarding Application No. 18157697.6, dated Mar. 14, 2018, 6 pages.
Non-Final Office Action dated Jun. 16, 2022, in connection with U.S. Appl. No. 16/715,587, 12 pages.
Mediatek, "Further details on EAB", 3GPP TSG-RAN2 #76 Meeting, Nov. 14-18, 2011, R2-116094, 3 pages.

Zte et al., "Clarification on how EAB is applied in Shared Network", 3GPP TSG-SA WG1 Meeting #54, May 9-13, 2011, S1-111310, 3 pages.
"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.1.0 (Mar. 2011), 53 pages.
Ericsson, "Details of MAC DRX Control", TSG-RAN WG2 Meeting #61, Feb. 11-15, 2008, R2-080934, 5 pages.
Qualcomm Incorporated, "Assistance Information for MBMS UEs in RRC_Idle mode", 3GPP TSG-RAN WG2 #75bis, Oct. 10-14, 2011, R2-115104, 3 pages.
Huawei, HiSilicon, "How does the UE determine whether neighbour cells of MBMS frequency can provide the service (s) that it is interested to receive?", 3GPP TSG-RAN WG2 Meeting #75, Aug. 22-26, 2011, R2-114430, 4 pages.
Huawei, "[75#35]—LTE: MBMS Service Continuity", 3GPP TSG RAN WG2 #75bis, Oct. 10-14, 2011, R2-115017, 21 pages.
Randy H. Katz, "Adaptation and Mobility in Wireless Information Systems", IEEE Personal Communications, 1994, 12 pages.
"3rd Generation Partnership Project; Technical Specification Group Radio Access Network Extending 850MHz Study Item Technical Report", 3GPP TR 37.806 V1.1.0 (Aug. 2011), 75 pages.
Office Action dated Mar. 30, 2020 in connection with Brazilian Patent Application No. 112014004199-7, 10 pages.
Office Action dated Apr. 7, 2020 in connection with Brazilian Patent Application No. 112014008713-0, 11 pages.
Office Action dated Apr. 3, 2020 in connection with Chinese Patent Application No. 201710709108.1, 15 pages.
Office Action dated Mar. 27, 2020 in connection with Chinese Patent Application No. 201711026422.6, 23 pages.
Decision of Patent dated Feb. 26, 2020 in connection with Korean Patent Application No. 10-2012-0087076, 8 pages.
Office Action dated Apr. 13, 2020 in connection with Korean Patent Application No. 10-2012-0087760, 8 pages.
Office Action in connection with Korean Application No. 10-2019-0169542 dated Feb. 5, 2020, 10 pages.
Office Action in connection with Korean Application No. 10-2013-0006771 dated Nov. 28, 2019, 9 pages.
Decision of Patent in connection with Korean Application No. 10-2012-0140229 dated Dec. 19, 2019, 8 pages.
3GPP TS 36.321 V10.4.0 (Dec. 2011), Technical Specification, 3rd Generation Partnership Project; Technical Specification Group Radio Access Network; Evolved Universal Terrestrial Radio Access (E-UTRA); Medium Access Control (MAC) protocol specification (Release 10), Dec. 2011, 54 pages.
Samsung, "PS-only high level function description," TD S2-110485, SA WG2 Temporary Document, 3GPP TSG SA WG2 Meeting #89, Vancouver, Canada, Feb. 6-10, 2012, 3 pages.
Decision of Patent in connection with Korean Application No. 10-2013-0006771 dated May 28, 2020, 5 pages.
Chairman, "Notes", 3GPP TSG RAN WG2 #74, May 9 -13, 2011, R2-11xxxx, 84 pages.
CATT, "Detail on SCell RACH Configuration", 3GPP TSG RAN WG2 Meeting #78, May 21-25, 2012, R2-122175, 3 pages.
"LTE; Evolved Universal Terrestrial Radio Access (E-UTRA); Medium Access Control (MAC) protocol specification (3GPP TS 36.321 version 10.4.0 Release 10)", ETSI TS 136 321 V10.4.0 (Jan. 2012), 56 pages.
Juniper, "Overview of PDP contexts and Bearers", https://www.juniper.net/documentation/en_US/junos-mobility11.2/topics/concept/gateways-mobility-bearer-overview.html, Nov. 16, 2011, 2 pages.
Telcoloewe, "PDP context vs. EPS Bearer", https://telcoloewe.wordpress.com/2010/01/28/pdp-context-vs-eps-bearer/, Jan. 28, 2010, 1 page.
"LTE; Evolved Universal Terrestrial Radio Access (E-UTRA); Medium Access Control (MAC) protocol specification (3GPP TS 36.321 version 8.2.0 Release 8)", ETSI TS 136 321 V8.2.0 (Nov. 2008), 35 pages.
European Search Report dated Jan. 12, 2021 in connection with European Patent Application No. 20 20 1347, 10 pages.
Office Action dated Jan. 12, 2021 in connection with U.S. Appl. No. 16/505,106, 125 pages.

(56) References Cited

OTHER PUBLICATIONS

Samsung, "Discussion on FGI bit handling for FDD/TDD dual mode UE", 3GPP TSG-RAN2 #75 meeting, Aug. 22-26, 2011, R2-114177, Athens, Greece, 8 pages.
Clearwire, "E-UTRA capability handling for dual mode UEs (FDD/TDD)", 3GPP TSG-RAN Meeting #54, Dec. 6-9, 2011, RP-111618, Berlin, Germany, 4 pages.
Clearwire, "Capability handling for dual mode UEs (FDD/TDD)", TSG-RAN Working Group 2 Meeting #75bis, Oct. 10-14, 2011, R2-115468, Zhuhai, China, 5 pages.
Samsung, "Report: [75#32] FGI bit handling for FDD/TDD dual mode UE", 3GPP TSG-RAN2 #75bis meeting, Oct. 10-14, 2011, Tdoc R2-115034, Zhuhai, China, 9 pages.
3rd Generation Partnership Project; Technical Specification Group Radio Access Network; Evolved Universal Terrestrial Radio Access (E-UTRA) Radio Resource Control (RRC); Protocol specification (Release 9) 3GPP TS 36.331, V9.0.0, Sep. 2009, 213 pages.
Final Office Action dated Apr. 16, 2021, in connection with U.S. Appl. No. 16/715,587, 13 pages.
Final Office Action dated May 10, 2021, in connection with U.S. Appl. No. 16/505,106, 62 pages.
Non-Final Office Action dated Jun. 11, 2021, in connection with U.S. Appl. No. 16/676,138, 16 pages.
U.S. Appl. No. 14/850,294, filed Sep. 10, 2015, Non-Final Office Action dated Mar. 30, 2017, 26 pages.
U.S. Appl. No. 15/243,280, filed Aug. 22, 2016, Non-Final Office Action dated Mar. 24, 2017, 26 pages.
"Issues of Random Access Procedure on SCell," 3GPP TS-RAN WG2 Meetings #74, R2-112922, Asustek, Barcelona, Spain, May 9-13, 2011, 4 pages.
"Considerations on Random Access on SCell," 3GPP TS RAN WG2#74, R2-113192, ITRI, Barcelona, Spain, May 9-13, 2011, 4 pages.
"Consideration on RA Response Window Size for SCell," 3GPP TSG RAN WG2 Meeting #79, R2-123485, New Postcom, Qingdao, China, Aug. 13-17, 2012, 3 pages.
"Section 23.1 RRC Connection Establishment," Long Term Evolution, www.lte-bullets.com, Aug. 12, 2011, 4 pages.
Foreign Communication From a Related Counterpart Application, Russian Application No. 2014106662/08(010558), Decision on Grant dated Jan. 20, 2017, 17 pages.
Notice of Allowance dated Jul. 16, 2021 in connection with U.S. Appl. No. 16/940,248, 78 pages.
Office Action dated Sep. 22, 2021 in connection with U.S. Appl. No. 16/505,106, 83 pages.
Office Action dated Oct. 29, 2021 in connection with India Patent Application No. 201938025200, 4 pages.
Office Action dated Oct. 28, 2021 in connection with U.S. Appl. No. 16/715,587, 27 pages.
Final Office Action dated Mar. 22, 2022, in connection with U.S. Appl. No. 16/715,587, 18 pages.
Communication under Rule 71 (3) EPC dated Nov. 3, 2022 in connection with European Patent Application No. 13 741 031.2, 53 pages.
Notification of Due Registration Formalities dated Sep. 28, 2022 in connection with Chinese Patent Application No. 201910459535.8, 11 pages.
Notice of Allowance dated Oct. 3, 2022 in connection with U.S. Appl. No. 16/676,138, 17 pages.
Office Action dated Sep. 30, 2022 in connection with U.S. Appl. No. 16/505,106, 49 pages.
Office Action dated Sep. 30, 2022 in connection with U.S. Appl. No. 17/200,364, 118 pages.
Mingju Li et al., "Access Probability Aware Cell Reselection for Load Balancing", Proceedings of ICCTA2009, IEEE, 2009, 4 pages.
Office Action dated Jan. 19, 2023 in connection with European Patent Application No. 20 201 347.0, 5 pages.
Office Action dated Dec. 28, 2022 in connection with U.S. Appl. No. 16/715,587, 26 pages.
Notice of Board Decision dated Mar. 27, 2023, in connection with U.S. Appl. No. 16/505,106, 10 pages.
Final OA dated Apr. 6, 2023, in connection with U.S. Appl. No. 17/200,364, 13 pages.
Notice of Allowance and Fee(s) Due dated Mar. 22, 2023, in connection with U.S. Appl. No. 16/715,587, 16 pages.

\* cited by examiner (a) when each PLMN has FULL EAB set (b) when all PLMNs have same EAB

METHOD AND APPARATUS FOR EFFICIENTLY CONTROLLING ACCESS FOR SYSTEM LOAD ADJUSTMENT IN MOBILE COMMUNICATION SYSTEMS

CROSS-REFERENCE TO RELATED APPLICATIONS

The present application is a continuation of U.S. patent application Ser. No. 16/693,122 filed on Nov. 22, 2019, which is a continuation of U.S. patent application Ser. No. 14/375,119 filed on Jul. 28, 2014, now U.S. Pat. No. 10,531,264 issued on Jan. 7, 2020, which is a 371 of International Patent Application No. PCT/KR2013/000667 filed on Jan. 28, 2013, which claims priority to U.S. Provisional Patent Application No. 61/591,385 filed on Jan. 27, 2012, and U.S. Provisional Patent Application No. 61/595,646 filed on Feb. 6, 2012, the disclosures of which are herein incorporated by reference in their entirety.

BACKGROUND

1. Field

The present invention relates to a method and apparatus of controlling network access efficiently to adjust the load of a mobile communication system.

2. Description of Related Art

Mobile communication systems were developed to provide mobile users with communication services. With the rapid advance of technologies, the mobile communication systems have evolved to the level capable of providing high speed data communication service beyond the early voice-oriented services.

Recently, the next generation mobile communication system moves its focus to Human to Machine (H2M) and Machine to Machine (M2M) communication beyond Human to Human (H2H) communication. In order to meet such a requirement, the 3$^{Rd}$ Generation Partnership Project (3GPP) communication standard organization is standardizing on Machine Type Communications (MTC). MTC has characteristics different from those of the conventional radio communication. The MTC characteristics are classified variously depending on the usage purpose. For example, the MTC devices requiring communication a few times a day without periodicity have delay tolerant characteristic. In contrast, the MTC device fixed at a location to collect and transfer predetermined information has the characteristic of low mobility. The mobile network operator has to provide services in consideration of the coexistence of the MTC devices having various characteristics and legacy terminals.

Typically, a plurality of MTC devices exists within a cell. If the MTC devices attempt access simultaneously, the load of the access network may increase abruptly. This makes the network unstable and, as a consequence, most of the terminals are likely to fail initial access. Since the most MTC devices have delay tolerant characteristic, it is not necessary to establish connection to the base station immediately. If the load of the radio network exceeds a predetermined threshold value, the base station may restrict the initial attach of the MTC devices first to control the radio network load. The 3GPP working groups are discussing adoption of an extended access baring technique to control the radio access network lode. The normal access barring technique information is carried in a System Information Block (SIB).

The present invention proposes an access barring technique capable of controlling aforementioned various service accesses, particularly emergency call and MTC accesses.

SUMMARY

The present invention aims to provide a method and apparatus for executing access barring under various conditions depending on the type of the emergency call and allowing a terminal to attempt emergency call in various manners in an environment supporting various types of emergency calls.

Also, the present invention aims to provide a method and apparatus for allowing an MTC device to transmit EAB information associated with various operators in the form of an EAB set.

In accordance with an aspect of the present invention, a data communication method of a terminal including a User Equipment (UE) Non-Access Stratum (NAS) and a UE Access Stratum (AS) in a wireless communication system includes receiving, at the UE AS, emergency call information including barring information per emergency call type from a base station, transmitting, at the UE NAS, an emergency call service request to the UE AS, and determining, at the UE AS, whether to bar the service request based on the emergency call information.

In accordance with another aspect of the present invention, a data communication method of a base station in a wireless communication system includes transmitting a message including data scheduling information to a terminal and transmitting emergency call information including barring information per emergency call type according to the data scheduling information.

In accordance with another aspect of the present invention, a terminal for communicating data in a wireless communication system includes a User Equipment (UE) Access Stratum (AS) which receives information including emergency call information including barring information per emergency call type from a base station and a UE Non-Access Stratum (NAS) which transmits an emergency call service request to the UE AS, wherein the UE AS determine whether to bar the service request based on the emergency call information.

In accordance with another aspect of the present invention, a base station for communicating data in a wireless communication system includes a transceiver which transmits a message including data scheduling information to a terminal and a controller which controls transmitting emergency call information including barring information per emergency call type according to the data scheduling information.

In accordance with another aspect of the present invention, a data communication method of a base station in a wireless communication system includes transmitting a Public Land Mobile Network (PLMN) list supported by the base station to a terminal and transmitting a message including barring information per PLMN to the terminal, wherein the per-PLMN barring informations correspond in position to PLMNs contained in the PLMN list.

In accordance with still another aspect of the present invention, a data communication method of a terminal in a wireless communication system includes receiving a list of Public Land Mobile networks (PLMNs) supported by a base station from the base station and receiving a message including per-PLMN barring information from the base station, wherein the per-PLMN barring informations included in the message correspond in position to PLMNs contained in the PLMN list.

The method and apparatus of the present invention is advantageous in terms of facilitating network congestion control by making in possible to transmit various types of emergency calls and applying access barring depending on the network situation and type of the emergency call. Also, the method and apparatus of the present invention is advantageous in terms of diversifying emergency call transfer schemes in a network congestion situation by making it possible to change an access-barred emergency call type for another type of emergency call.

Also, the method and apparatus of the present invention is advantageous in terms of reducing system load and overhead by diminishing the size of the message in such a way of determining the message format per operator based on the EAB information of the MTC device.

DETAILED DESCRIPTION

Figure 1:
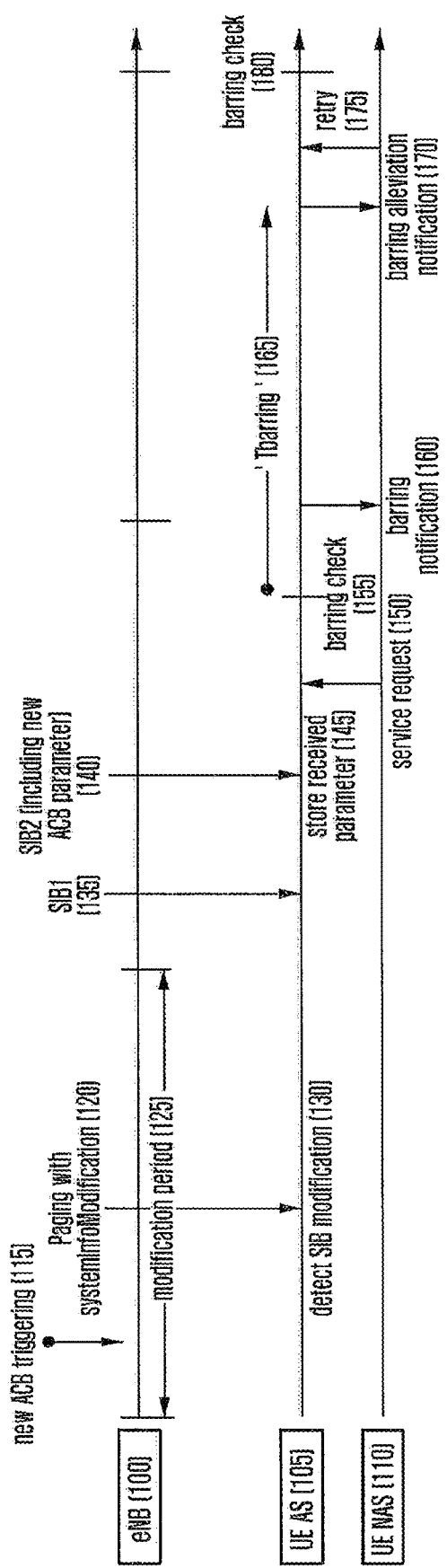
FIG. 1 is a diagram illustrating an ACB technique in the conventional LTE system.

Exemplary embodiments of the present invention are described with reference to the accompanying drawings in detail.

Detailed description of well-known functions and structures incorporated herein may be omitted to avoid obscuring the subject matter of the present invention. This aims to omit unnecessary description so as to make the subject matter of the present invention clear.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention relates to a method and apparatus for controlling access efficiently to adjust the system load in a mobile communication system. The present invention proposes an access baring method related to emergency call and MTC access.

In an embodiment, UE AS and UE NAS may be logical components included in the User Equipment (UE). Depending on the implementation, the logical components may be configured as hardware modules.

Prior to starting explanation of the present invention, the Access Class Barring (ACB) technique of the convention LTE system is described.

FIG. 1 is a diagram illustrating an ACB technique in the conventional LTE system. The ACB is a technique for controlling UE access to control system load and implemented in such a way that the eNB provides the UEs with the barring information through broadcasting in advance and thus the UEs attempts access to the network based on the their classes and the barring information broadcast by the eNB 100. If new ACB is triggered at step 115, the eNB 100 may notify the UE AS 105 that the System Information Block (SIB) is to be modified soon for the new ACB using systemInfoModification IE of the paging message at step 120.

If the paging message is received, the UE is aware at step 130 that the SIB is to be modified soon. The systemInfoModification IE included in the paging message is an indicator indicating the modification of SIB, the indicator being provided in various forms depending on the embodiment.

The eNB 100 notifies the UEs that SIB is to be modified soon, using the paging message transmitted during the modification period 125 before broadcasting the modified SIB. Afterward, the modified SIB is broadcast during the next modification period. The modification period is described in detail later.

After the modification period ends with the receipt of the paging message, the UE receives SIB1 135 carrying new information.

There are various types of SIBs for different purposes. The LTE Rel-11 standard specifies SIB1 to SIB14 and it is to diversify the the SIBs for supporting new functions. Among the SIBs, SIB1 may include the scheduling information of other SIBs.

Accordingly, the SIB1 has to be received first in order to receive other SIBs. After the receipt of the SIB1, the UE receives SIB2 including ACB information. The UE AS 105 stores the ACB information at step 145. If a service, i.e. communication service, is required, the UE NAS 110 requests the UE AS 105 for the service at step 150. The UE AS 105 determines whether to accept the access based on the store ACB information at step 155. The UE is allocated one of the classes 0 to 9 inevitably. The UE may be allocated one of classes 11 to 15 for special purposes additionally. Among the classes, class 10 relates to the emergency call. The eNB 100 may restrict the access of a certain class. In the LTE standard, it is impossible to designate one of classes 0 to 9 for access barring but it is possible to designate at least one of the special purpose classes 11 to 15 for special purposes for access barring.

Meanwhile, the eNB 100 provides the barring factors and barring time information associated with classes 0 to 9. The UE selects one of 0 and 1 randomly and compares the selected value with the barring factor. If the value selected by the UE is equal to or less than the barring factor, this means that the access is allowed. If the value selected by the UE is greater than the barring factor, this means that the eNB 100 bars the access and thus the eNB 100 notifies the UE NAS 110 of the reject of the access at step 160. If the access is rejected, the UE AS 105 calculates Tbarring value 165 based on the barring time information using equation (1). Equation 1 is a formula for calculating the Tbarring value 165 according to an embodiment. Depending on the embodiment, the Tbarring value 165 may be calculated differently.

$$\text{"Tbarring"}=(0.7+0.6*\text{rand})*ac\text{-BarringTime} \quad (1)$$

After the Tbarring time elapses, the UE AS 150 notifies the UE NAS 110 that it is possible to attempt access again at step 170.

At this time, the UE NAS 110 instructs to retry access to the UE AS 105 at step 175, and the UE AS 105 performs barring check again at step 180. The procedure may correspond to a normal Mobile Originating (MO) call or signaling, i.e. service request triggered by the UE.

The emergency call triggered by the UE differs somewhat from the normal MO call in procedure. The ACB information of the emergency call differs from the MO call or signaling. That is, the barring factor or barring time information is replaced with ac-barringForEmergency information. This IE is of the Boolean form indicating only whether the emergency call is allowed. If the IE is set to TRUE, this indicates the emergency call is not allowed and thus, after checking predetermined additional conditions, the access is rejected finally. Since no barring time information is provided, the UE AS 105 does not notify the UE NAS 110 of accessibility after Tbarring. The ACB operation for emergency call is described in more detail with reference to FIG. 4.

In the ACB operation for an MTC device, the ACB operation described with reference to FIG. 1 is not applied in order to provide the MTC device with the ACB information as quick as possible. Also, they differ from each other in ACB information format made up of the barring factor and barring time. The ACB operation for the MTC device is made in more detail later. For reference, the ACB for the purpose of MTC is referred to as Extended Access Barring (EAB) distinguished from the legacy ACB in the LTE standard.

Figure 2:
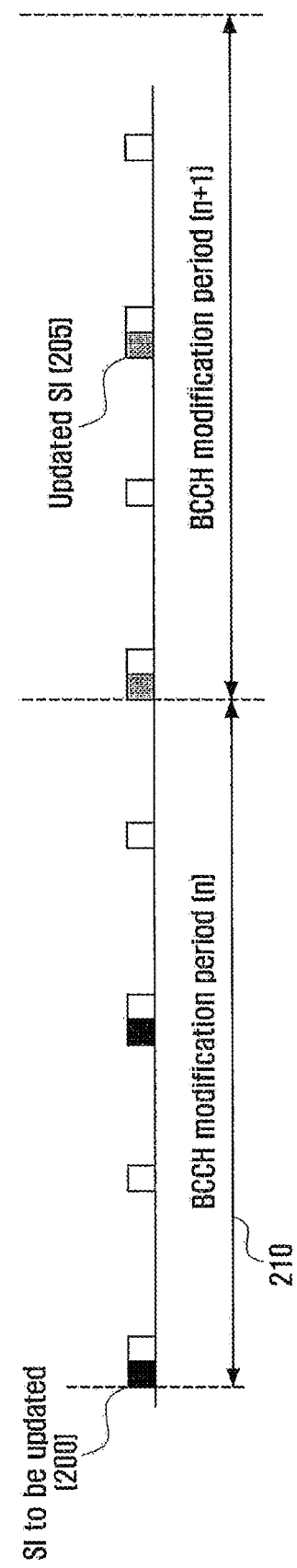
FIG. 2 is a diagram for explaining the modification period.

FIG. 2 is a diagram for explaining the modification period.

Referring to FIG. 2, the normal SIB is performed with the concept of modification period 210. That is, the evolved Node B (eNB) notifies the UE before SI update that the SI 200 is to be updated using the paging message during the modification period. If the paging message includes system-InfoModification IE, this means that the updated SIB 205 is transmitted during the next medication period.

Even when just one of the SIBs is modified, this is informed in the paging message. In the case of SIB10 and SIB11 carrying ETWS information, however, the SIB is updated independently of the boundary of the modification period. If the paging message includes the etws-Indication IE indicating existence of ETWS information, the UE receives SIB10 and SIB11 immediately. The length of the modification period is notified by SIB2, and tis maximum value is 10.24 seconds. This means that it may take up to 10.24 seconds to deliver the ACB information. Accordingly, it is not preferred to apply the modification period to the MTC device to which the ACB information has to be delivered promptly.

Figure 3:
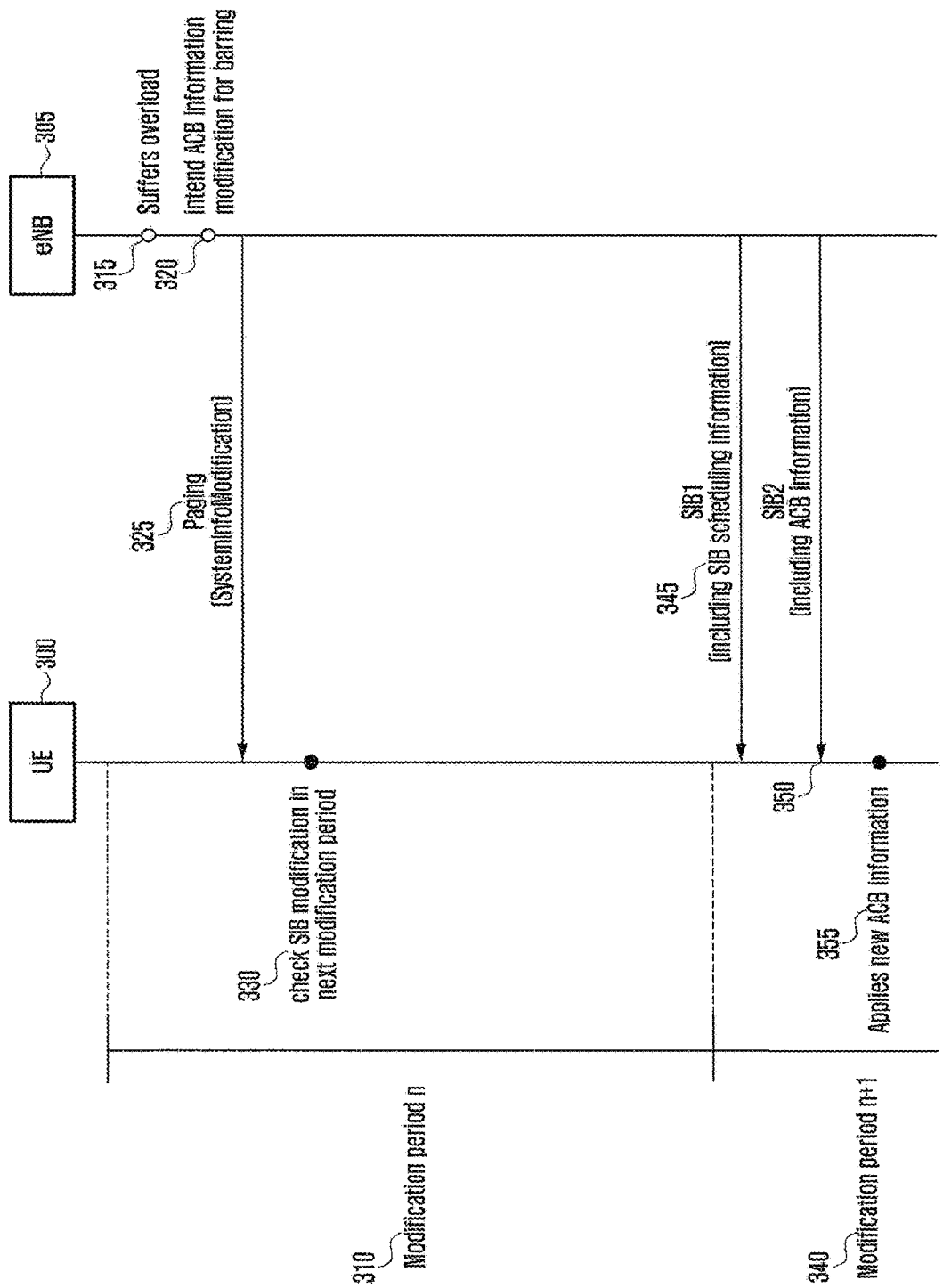
FIG. 3 is a signal flow diagram illustrating the normal SIB transmission method.

FIG. 3 is a signal flow diagram illustrating the normal SIB transmission method.

Referring to FIG. 3, the eNB 305 may detects abrupt increase of radio network load at step 315.

The eNB 305 restricts the initial attach attempts of the UEs 300 to control the radio network load at step 320.

In order to accomplish this, the eNB 305 sends the UE 300 the paging message including SystemInfoModification IE at step 325.

The UE 300 receives the paging message and checks that the SIB is modified in the next modification period at step 330.

If the next modification period 340 arrives, the UE 300 may attempt decoding SIB1 at step 345. This is because the SIB1 includes scheduling information on other SIBs.

The UE 300 may receive the SIB2 including EAB information at step 350. The UE 300 may acquire the modified ACB information from the SIB2 at step 355.

Figure 4:
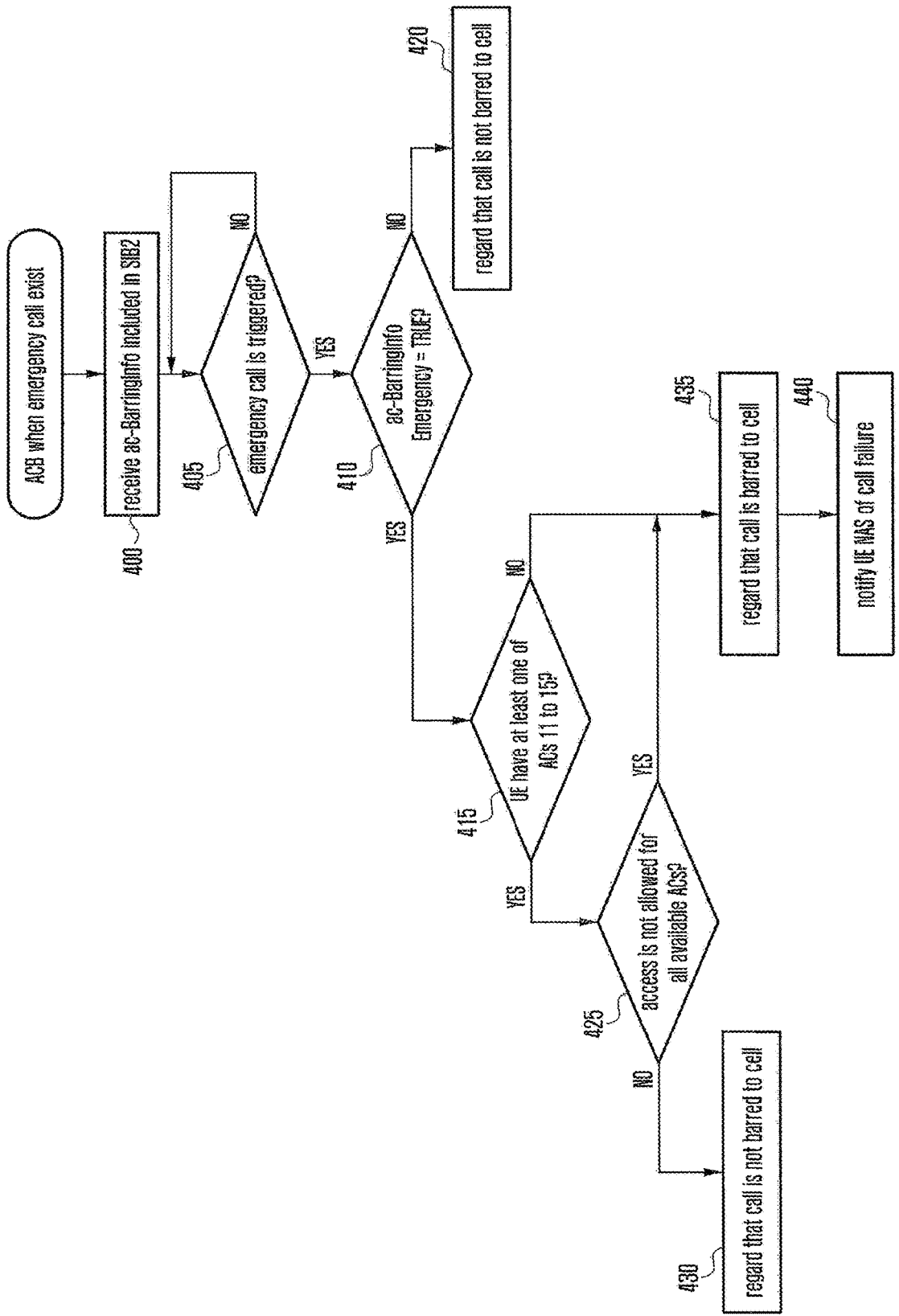
FIG. 4 is a flowchart illustrating the ACB procedure of emergency call in the conventional method.

FIG. 4 is a flowchart illustrating the ACB procedure of emergency call in the conventional method.

Referring to FIG. 4, the UE AS receives the SIB2 broadcast by the eNB at step 400. The SIB2 may include an ac-BarringInfo IE carrying the barring information.

The UE AS determines whether there is an emergency call request form the UE NAS at step 405.

If an emergency call is triggered, the UE AS determines whether the ac-BarringForEmergency IE included in the ac-BarringInfo IE is set to TRUE at step 410. If it is set to a value other than TRUE, the UE AS regards that the call is accepted. Otherwise if it is set to TRUE, the UE AS determines whether at least one of the special purpose classes 11 to 15 is included at step 415.

If not special purpose class is included, the UE AS regards that the call is not allowed at step 435 and notifies the UE NAS of this at step 440. If at least one special purpose class is included, the UE AS checks the barring information on the classes 11 to 15 which is included in the ac-BarringInfo IE. In an embodiment, 5-bit bitmap indicating the barring state of the special purpose classes is included in the ac-BarringInfo IE. The ac-BarringForMO-Data IE of the ac-Barring Info IE includes a 5-bit ac-BarringForSpecialAC IE. In an embodiment, the individual bits may be mapped to the ACs 11 to 15 sequentially. If each bit is set to 1, it is regarded that the corresponding AC is barred. At this time, the ACs 12, 13, and 14 are available in the home country while the ACs 11 and 15 are available only in HPLMN/HEPLMN. If at least one of the special purpose classes is allowed, it is regarded that the call access is accepted at step 430. Afterward, the UE may perform random access for connection to the eNB.

As the services available for provision are diversified, the Call Admission Control (CAC) for controlling the system load becomes complicated. Particularly, the emergency call is allocated a priority higher than the normal access for access allowance. However, the emergency call also may be sorted into one of various types such as SMS, voice, and video of which influences to the system load differ from each other. Accordingly, it is necessary to perform CAC in consideration of the type of emergency call. In the conventional technology, there is only one type of the emergency call. However, as the services provided through the mobile communication system become diversified, it has to be considered to sort the emergency calls into various types. For example, the emergency calls may be sorted into Short Message Service (SMS) type, voice type, and video type. The influences to the system load may differ depending on the type of emergency call. For example, the SMS type may carry restricted information but have relatively small influence to the system load. The video type may carry enriched information but have relatively large influence to the system load. Accordingly, it is necessary for the UE NAS to select the type of emergency call according to the system environment and, if the barring information is provided in adaptation to the type of the emergency call, it is possible to manage the emergency calls more efficiently in view of system load. Embodiment 1 proposes a UE operation for providing the barring informations adaptive to the types of emergency calls and utilizing the type-adaptive barring information efficiently.

The second embodiment proposes a method of providing the ACB information to the MTC device. Particularly, the second embodiment proposes a method of configuring the ACB information.

Embodiment 1

Embodiment 1 proposes a UE operation for providing the barring informations adaptive to the types of emergency calls and utilizing the type-adaptive barring information efficiently. In the present invention, plural types of emergency calls are defined with respective ACB informations. The UE determines the types of the emergency calls based on the ACB information broadcast by the eNB.

Figure 5:
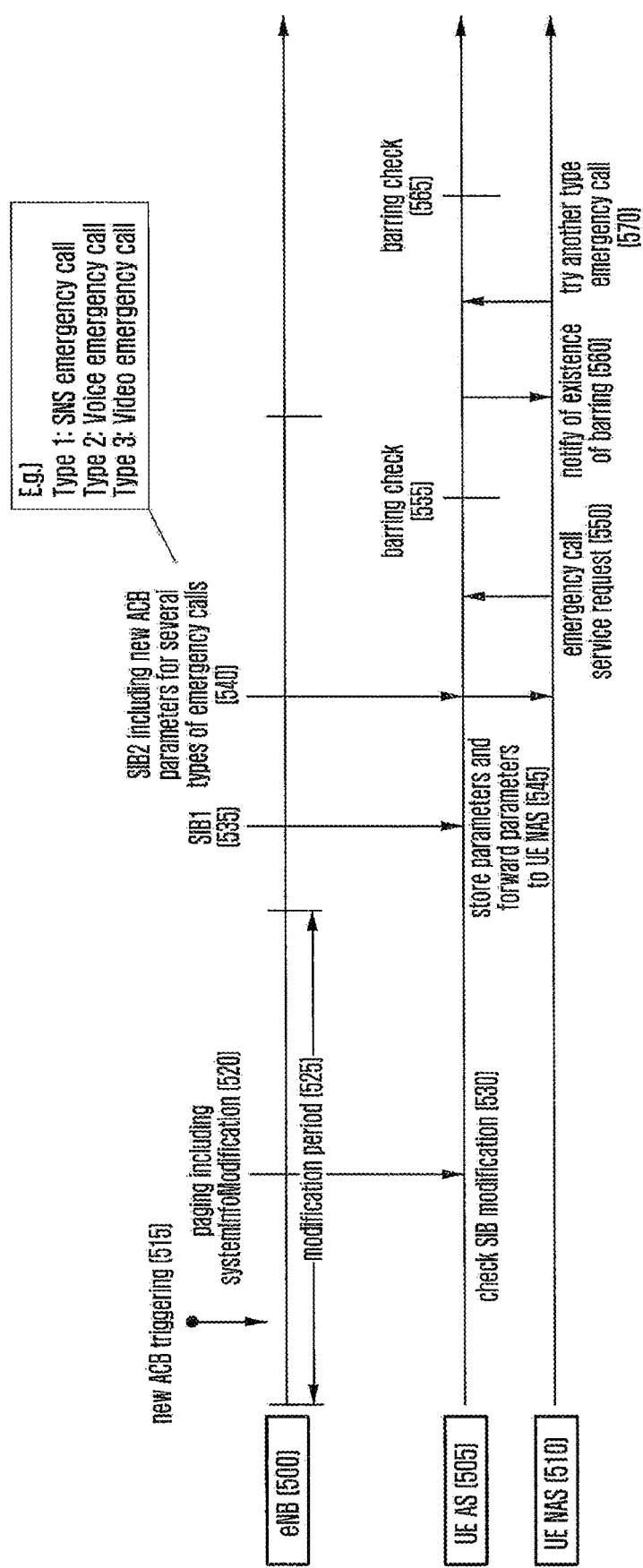
FIG. 5 is a diagram for explaining the procedure of controlling ACB of a plurality of emergency calls in the present invention.

FIG. 5 is a diagram for explaining the procedure of controlling ACB of a plurality of emergency calls in the present invention.

In FIG. 5, the UE AS 505 and the UE NAS 510 may be logical or physical modules included in the UE.

Referring to FIG. 5, if new ACB is triggered at step 515, the eNB 500 notifies the UE AS 505 that the SIB is to be changed soon due to the new ACB, using the systemInfoModification IE of the paging message at step 520.

Upon receipt of the paging message, the UE is aware at step 530 that the SIB is modified soon. The eNB notifies the UEs that the SIB is modified soon, using the paging message transmitted during the modification period 525 before broadcasting the modified SIB.

Afterward, the modified SIB is broadcast in the next modification period. After receiving the paging message in the modification period, the UE receives the SIB1 at step 535 to acquire new SIB.

At step 540, the UE receives SIB2 including ACB information based on the SIB1 received at step 535. The ACB information may include the barring information determined depending on the type of emergency call. In an embodiment, the emergency calls are sorted into SMS type, voice type, and video type. Each type has ac-BarringForEmergency IE indicating whether its access is allowed. Depending on the embodiment, the ACB information may include barring factor and barring time per type of emergency call.

The UE AS 505 stores the ACB information at step 545. In the present invention, the ACB information may be sent to the UE NAS 510. The ACB information may be transferred to the UE NAS 510 as it has been received by the UE AS 505 or after being processed. For example, the information to be transferred to the UE NAS 510 may be per-emergency call type ACB informations, per-emergency call type access allowance probability values as virtual ACB check result, or restricted emergency call type list information. The information format may be selected when the UE NAS 510 triggers the emergency call. In an exemplary case of high system load, the voice or video type emergency call may cause significant burden to the system. Accordingly, the eNB may allow for only the SMS type access but not two other types.

The UE NAS 510 selects an appropriate type and sends the UE AS 505 an emergency call service request at step 550. If the UE NAS 510 has received the parameters included in the SIB1 at step 545, step 550 may be performed selectively.

The UE AS 505 performs barring check at step 555. The UE AS 505 performs the barring check finally. Since the ACB information has be transferred to the UE NAS 510 at step 545, the barring probability of the request is likely to decreases after the UE AS 505 has perform the barring check. However, if the ACB information is corrupted due to any reception error or if the emergency call type is selected without ACB information, this may cause barring the call. If the call is not allowed, the UE AS 505 notifies the UE NAS 510 of this at step 560.

The UE NAS 510 selects another type of emergency call to retry at step 570.

The UE AS 505 performs barring check at step 565. If it is determined that the call is allowed, the UE AS 505 attempts random access to the eNB 500.

In FIG. 5, the UE AS 505 sends the UE NAS 510 the received barring information, and the UE NAS 510 select an appropriate type of emergency call based on the barring information and sends the UE AS 505 a service request. At this time, the UE AS 505 performs the final barring check on the request. In the present invention, however, other processes may be performed. The process of transferring the barring information received at the UE AS 505 to the UE NAS 510 is identical with the process in FIG. 5. However, the UE NAS 510 may perform the barring check as well as select the appropriate type of emergency call. In this case, the service request transmitted from the UE NAS 510 to the UE AS 505 is transmitted to the eNB 500 immediately without barring check of the UE AS 505. Although the two aforementioned methods are similar to each other with the exception whether the barring check is performed by the UE NAS 510 or the UE AS 505. In another method, the UE AS 505 sends the UE NAS 510 the information on whether the service request of the UE NAS 510 is barred other than the barring information like the conventional ACB. The UE NAS 510 reselects another type in the stead of the barred emergency call type to retry the service request.

Figure 6:
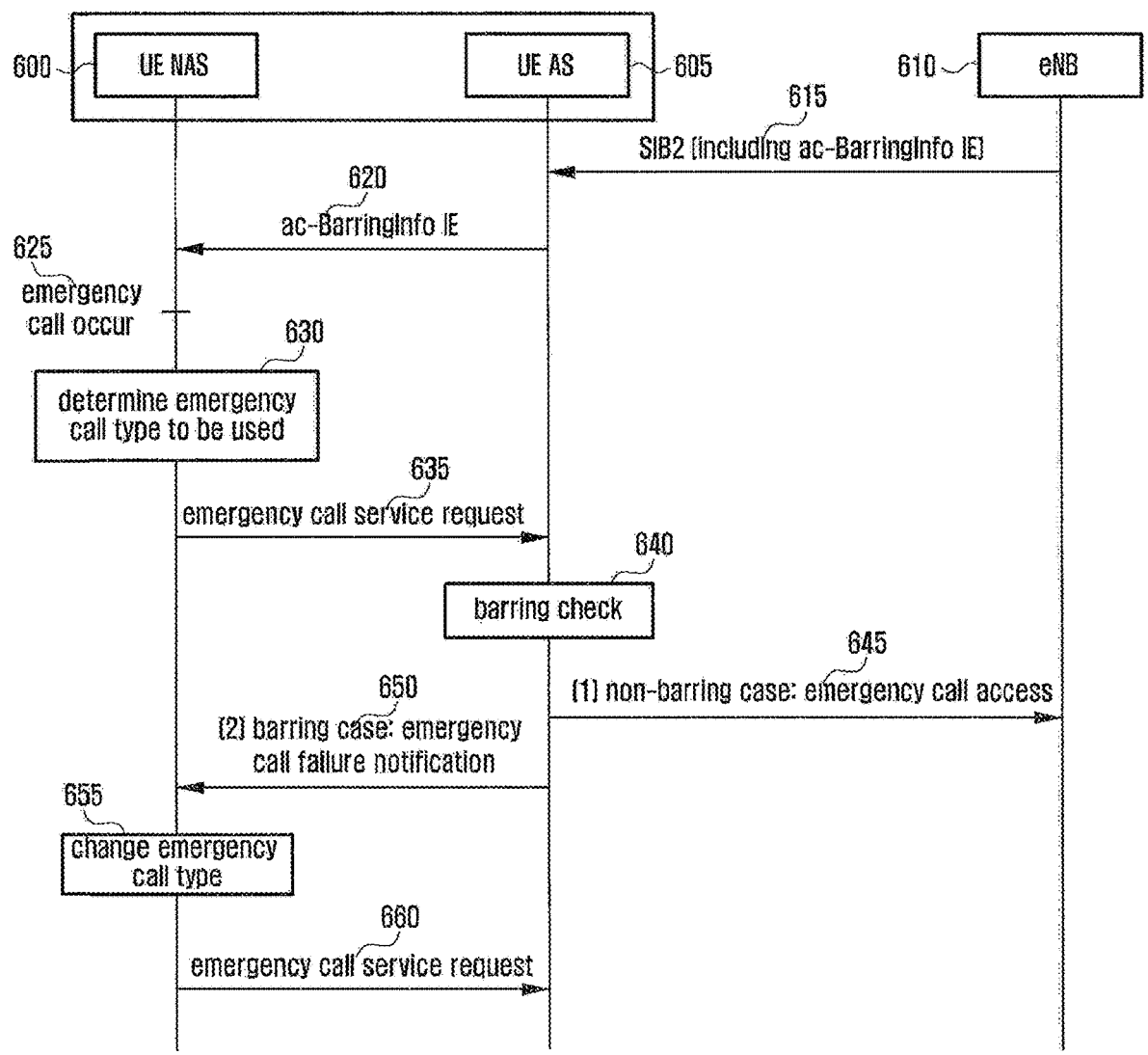
FIG. 6 is a signal flow diagram illustrating the operation procedure of embodiment 1.

FIG. 6 is a signal flow diagram illustrating the operation procedure of embodiment 1.

In FIG. 6, the UE NAS 600 and UE AS 650 may be physical or logical components includes in the UE.

The eNB 610 sends the UE AS 605 the SIB2 at step 615. The SIB2 includes the ACB information, i.e. ac-BarringInfo IE. The ac-Barring Info IE includes ac-BarringForEmergency, ac-BarringForMO-Signaling, and ac-BarringForMo- Data IE. The IEs include the conventional emergency call barring information, Mobile originating-signaling barring information, and mobile originating data barring information, respectively. In an embodiment, the ac-BarringInfo IE may include new barring informations on various types of emergency calls in addition to the conventionally-included informations. For example, the ac-BarringInfo IE further includes ac-BarringForEmergency-SMS, ac-BarringForEmergency-Voice, and ac-BarringForEmergency-Video IEs. These new IEs have Boolean values indicating whether the respective emergency call types are access-barred.

The UE AS 650 sends the UE NAS 600 the ac-BarringInfo IE at step 620. Step 620 is optional and thus the ac-BarringInfo IE may not be transmitted. If the ac-BarringInfo IE is received, the ac-BarringInfo IE may facilitate for the UE NAS 600 to select an appropriate type of emergency call.

The UE NAS 600 triggers an emergency call at step 625.

The UE NAS 600 selects an emergency call type at step 630 and sends the UE AS 650 a service request at step 635.

The UE AS 650 performs barring check at step 640. If the ACB information has been transferred to the UE NAS and if the UE NAS 600 has selected an appropriate type of emergency call based on the ACB information, this step is obviated. In an embodiment, however, it is not ruled out that the ACB information is not sent to the UE NAS 600 and thus this step is included.

If the access for the call is allowed, the UE AS 605 attempts access to the eNB at step 645. Otherwise if the access for the call is not allowed, the UE AS 650 notifies the UE NAS 600 of the access failure.

The UE NAS 600 selects another type of emergency call at step 655 and sends the UE AS 605 a service request at step 660. The service request may be made based on the signal received at step 650 depending on the embodiment.

Figure 7:
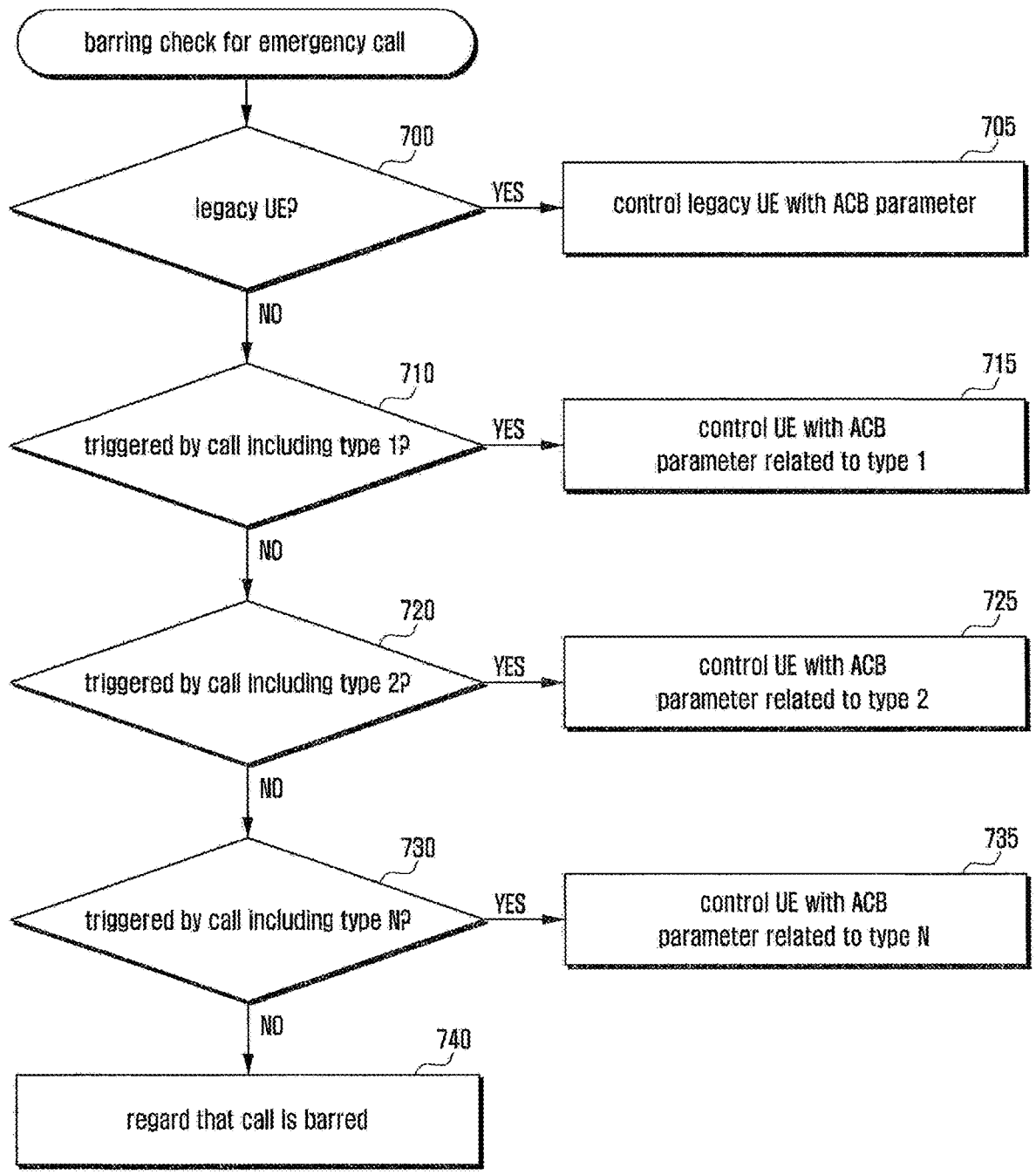
FIG. 7 is a flowchart illustrating the ACB parameter selection procedure when the UE AS performs the barring check.

FIG. 7 is a flowchart illustrating the ACB parameter selection procedure when the UE AS performs the barring check.

Referring to FIG. 7, the UE AS determines whether the corresponding UE is a legacy UE at step 700. In the present invention, the term 'legacy UE' means the UE which cannot support multiple emergency calls and related UE operations. That is, the legacy UE can recognize only a single type of emergency call. If the UE is the legacy UE, the UE cannot distinguish among the ACB informations but recognize all as the legacy ACB information and thus determines whether the access is allowed in consideration of only the legacy ACB information as the operation at step 705.

If the UE is not a legacy UE, the UE NAS checks the types of the emergency call at steps 710, 720, and 730, and determines whether the access is allowed at steps 715, 725, and 735 based on the corresponding ACB information.

Figure 8:
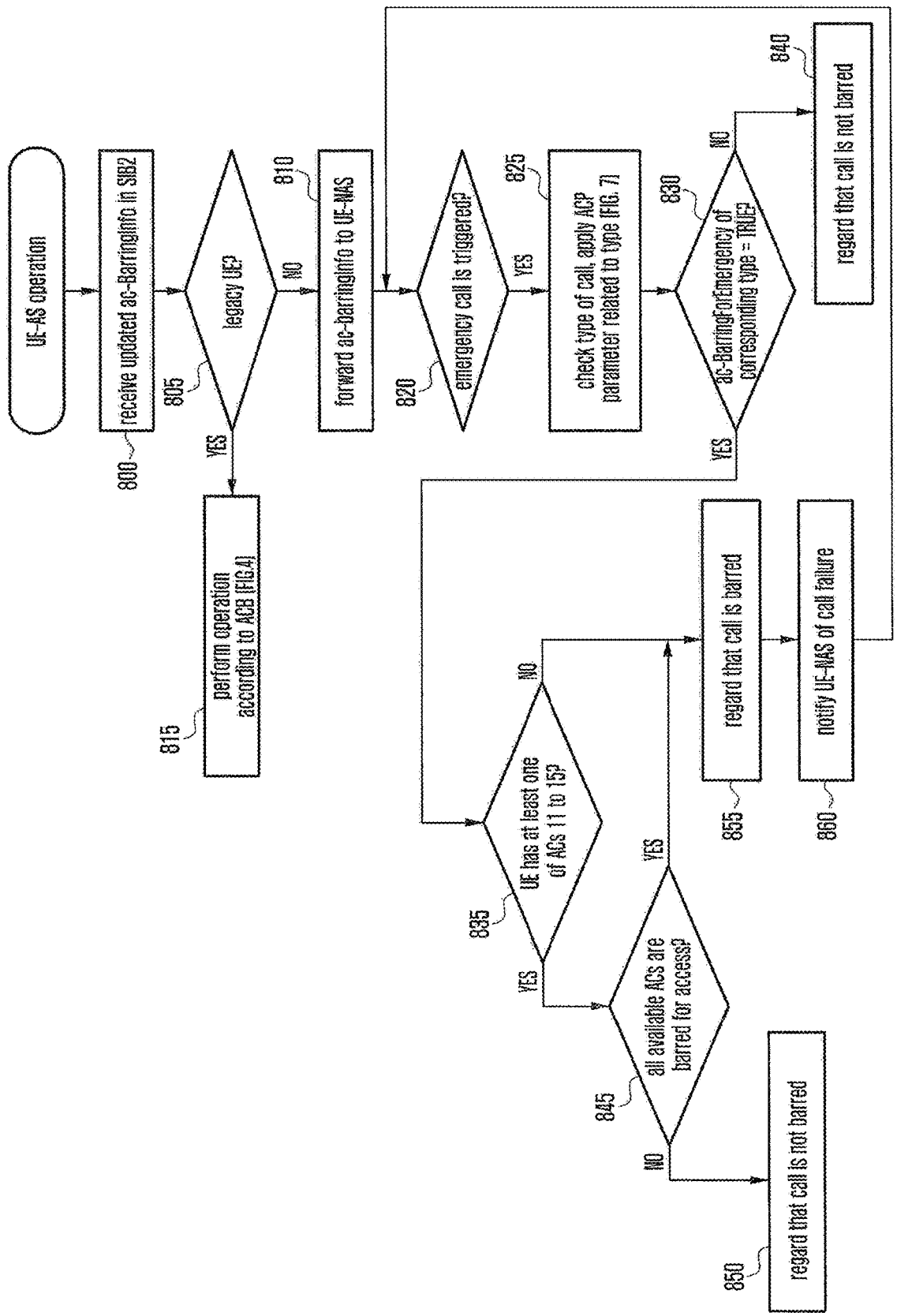
FIG. 8 is a flowchart illustrating the UE AS operation in embodiment 1.
Figure 9:
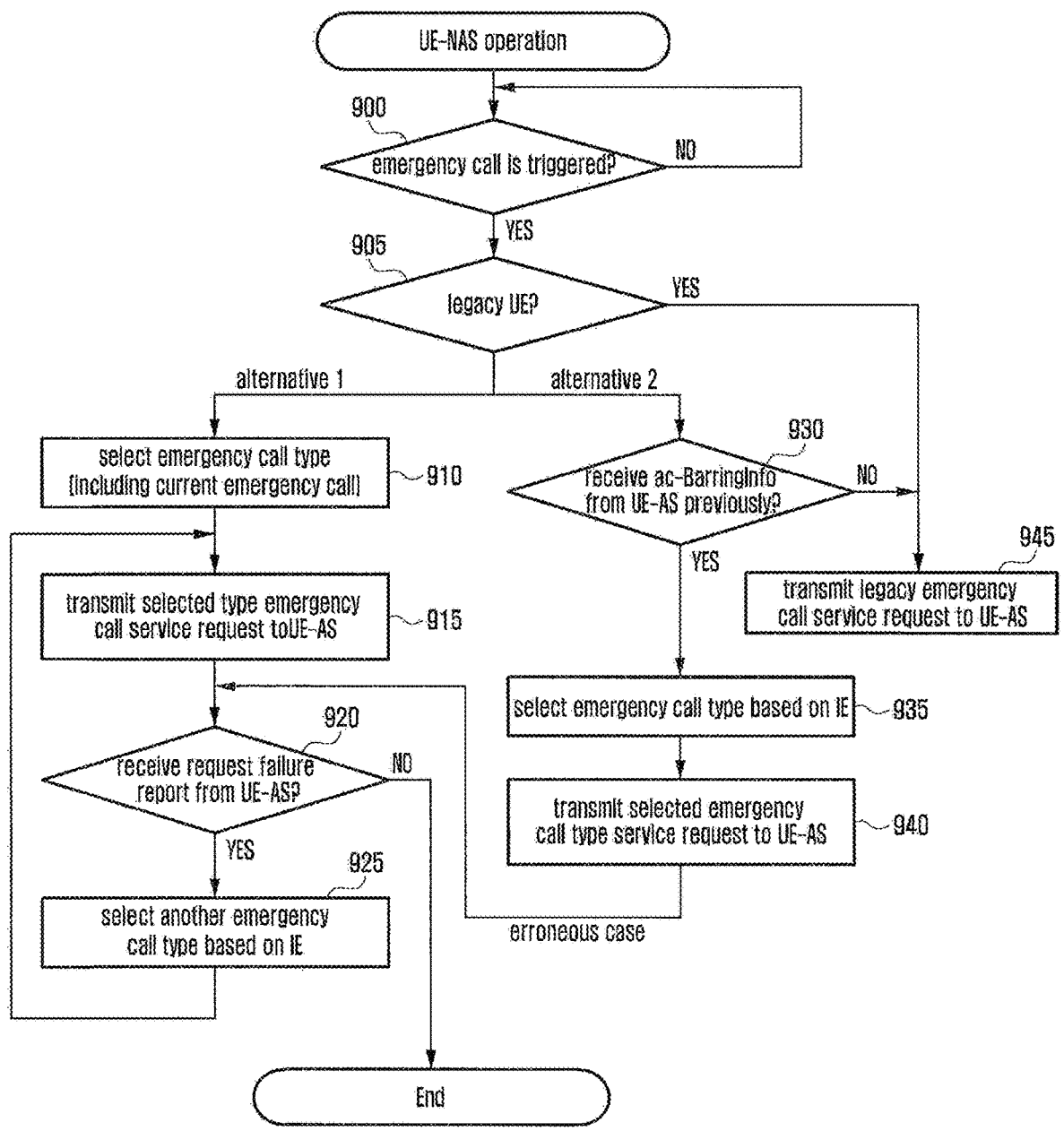
FIG. 9 is a flowchart illustrating the UE NAS operation in embodiment 1.

FIGS. 8 and 9 are directed to the case where a legacy UE exists in the service area of the eNB supporting multiple emergency call types. It is also possible that the eNB is a legacy eNB which does not support multiple emergency call types although the UE support the multiple emergency call types. It is also possible to define the UE operations in such cases, which are described in detail with reference to FIGS. 16, 17, and 18.

FIG. 8 is a flowchart illustrating the UE AS operation in embodiment 1.

Referring to FIG. 8, the UE AS receives ac-BarringInfo IE in the SIB2 broadcast by the eNB at step 800.

The UE determines whether the UE itself is the legacy UE at step 805. The legacy UE which cannot understand the ACB information proposed in the present invention performs the legacy ACB operation at step 815.

In the case of non-legacy UE, the UE AS sends the UE NAS the ac-BarringInfo IE at step 810.

The UE AS determines whether an emergency call is triggered by the UE NAS at step 820.

If so, the UE AS checks the type of the emergency call and applies the ACB information corresponding thereto at step 825.

The UE AS checks the applied ACB information and determines whether the corresponding type call access is allowed at step 830. That is, if the ac-BarringForEmergency IE is not set to TRUE, the UE AS regards that the access is allowed for the corresponding call. Otherwise if the IE is set to TRUE, the UE determines whether the IE includes at least one of the special purpose classes 11 to 15 in addition to the classes 0 to 9 at step 835.

If there is not special class included, the UE AS regards that the call is not allowed and notifies the UE NAS of this. If at least one special purpose class is included, the UE AS checks the barring informations on the classes 11 to 15 included in the ac-BarringInfo IE at step 845. The barring indication informations on the special purpose classes 11 to 15 are included in the ac-BarringInfo IE in the form of 5-bit bitmap.

If the at least one of the special purpose classes of the UE is allowed for access, the UE AS regards that the access for the call is allowed at step 850. Afterward, the UE may perform a random access procedure to try to attach to the eNB.

FIG. 9 is a flowchart illustrating the UE NAS operation in embodiment 1.

Referring to FIG. 9, the UE NAS determines whether an emergency call is requested at step 900.

If an emergency call is requested, the UE NAS determines whether the UE is a legacy UE at step 905.

If the UE is a legacy UE, the UE NAS performs legacy ACB operation at step 945.

If the UE is not a legacy UE, the UE NAS performs one of two processes selectively.

The first process is of selecting the type of emergency call without checking the ACB information at step 910.

After selecting the emergency call type, the UE NAS sends the UE AS a service request for the emergency call at step 915.

The UE NAS determines whether a request failure is reported by the UE AS at step 920.

If the access reject is reported by the UE AS, the UE NAS selects another type of emergency call and returns the procedure to step 915. Typically, the emergency call type reselection may be performed according to a predetermined rule. For example, the video type emergency call has failed for the first service request, the SMS or voice type emergency call may be selected for low system load. This is because the SMS or vice type emergency call causing low system load as compared to the vide type emergency call has relatively high probability for access. From the view point of the eNB, it may allow for the access causing no significant system load such as SMS type rather the barring all the types of emergency call accesses even in the high system load situation. Unlike the conventional technology, if the UE AS provides the UE NAS the received ACB information, the UE NAS may select the access-allowed emergency call type. That is, the UE NAS determines whether the ac-BarringInfo has been received from the UE AS in advance at step 930.

The UE NAS selects an emergency call type based on the information at step 935. The UE NAS sends the UE AS the service request for the call at step 940. Although the UE NAS has the ACB information, an error may occur in receiving signals. Accordingly, the UE AS may perform the barring check before attempt real access to the eNB. In this case, the UE NAS waits for the barring check result from the UE AS at step 920. If it fails, the UE NAS selects another type to retry.

Figure 16:
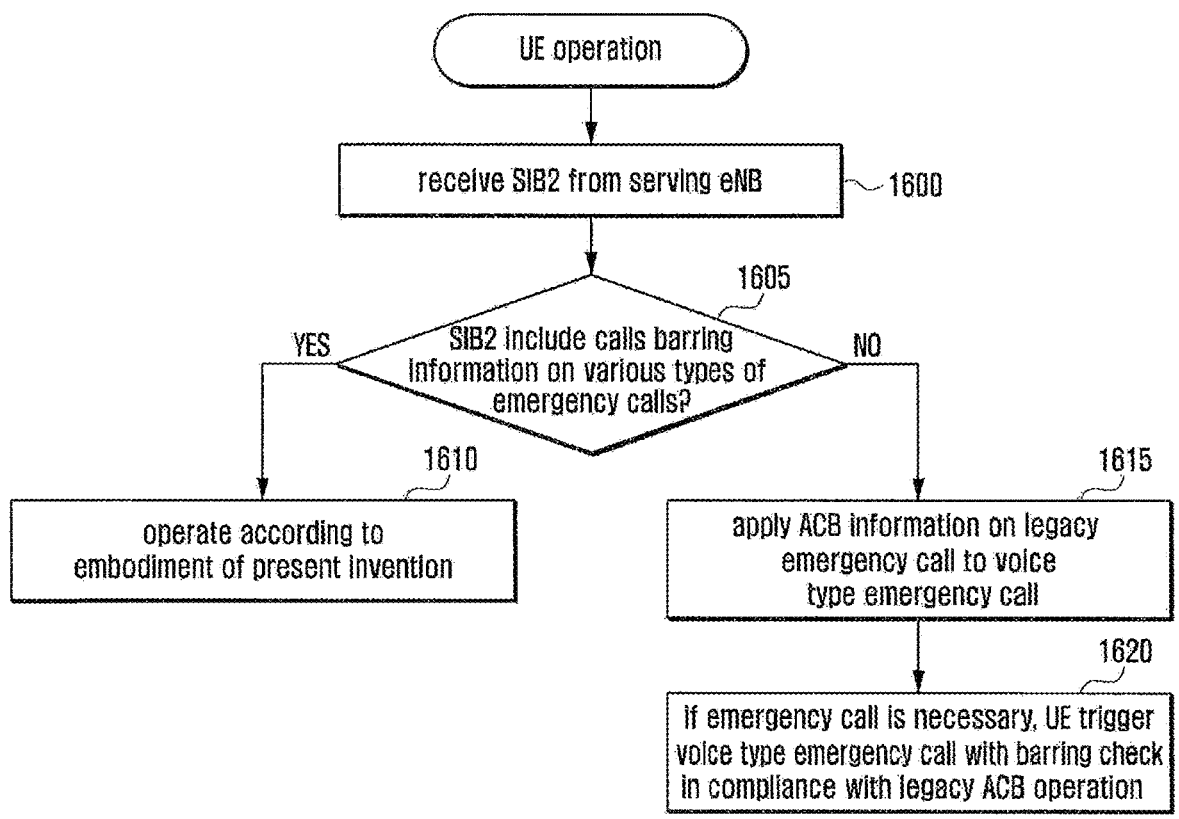
FIG. 16 illustrates an example of operations of a first UE according to certain embodiments of this disclosure.
Figure 17:
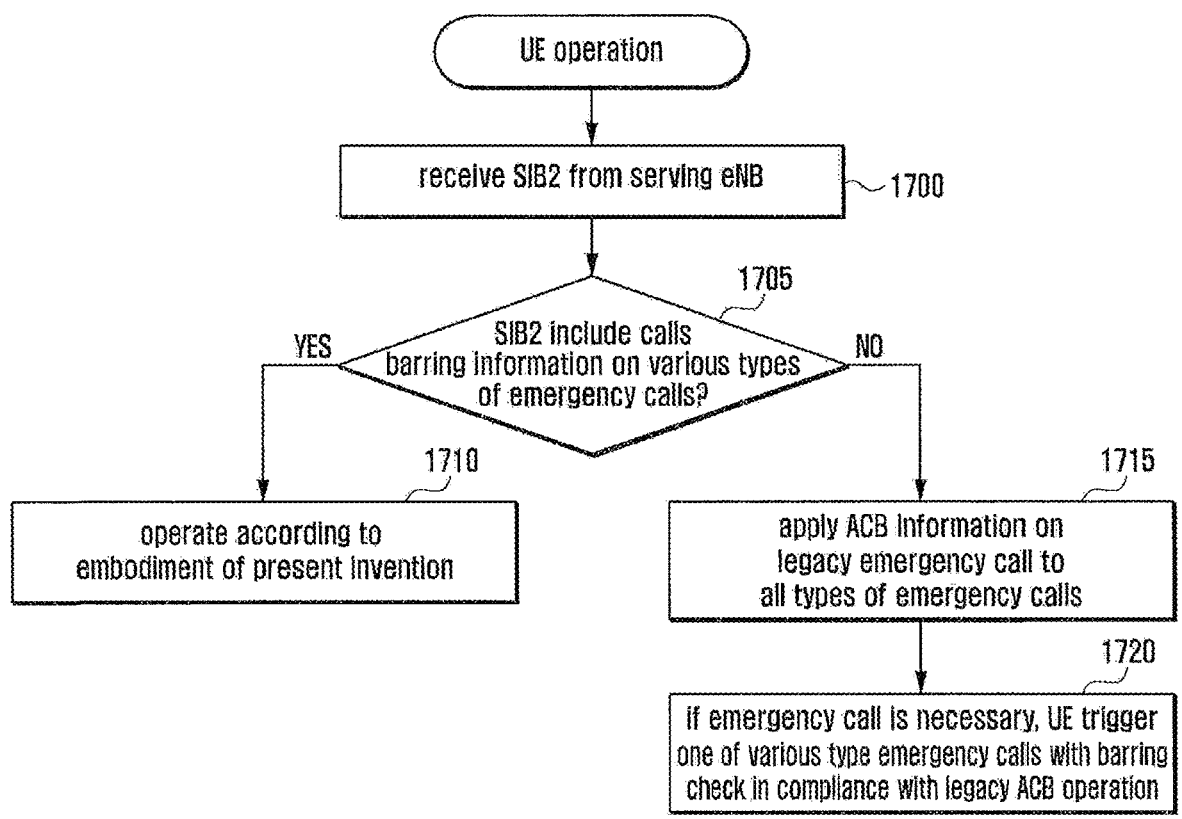
FIG. 17 illustrates an example of operations of a second UE according to certain embodiments of this disclosure.
Figure 18:
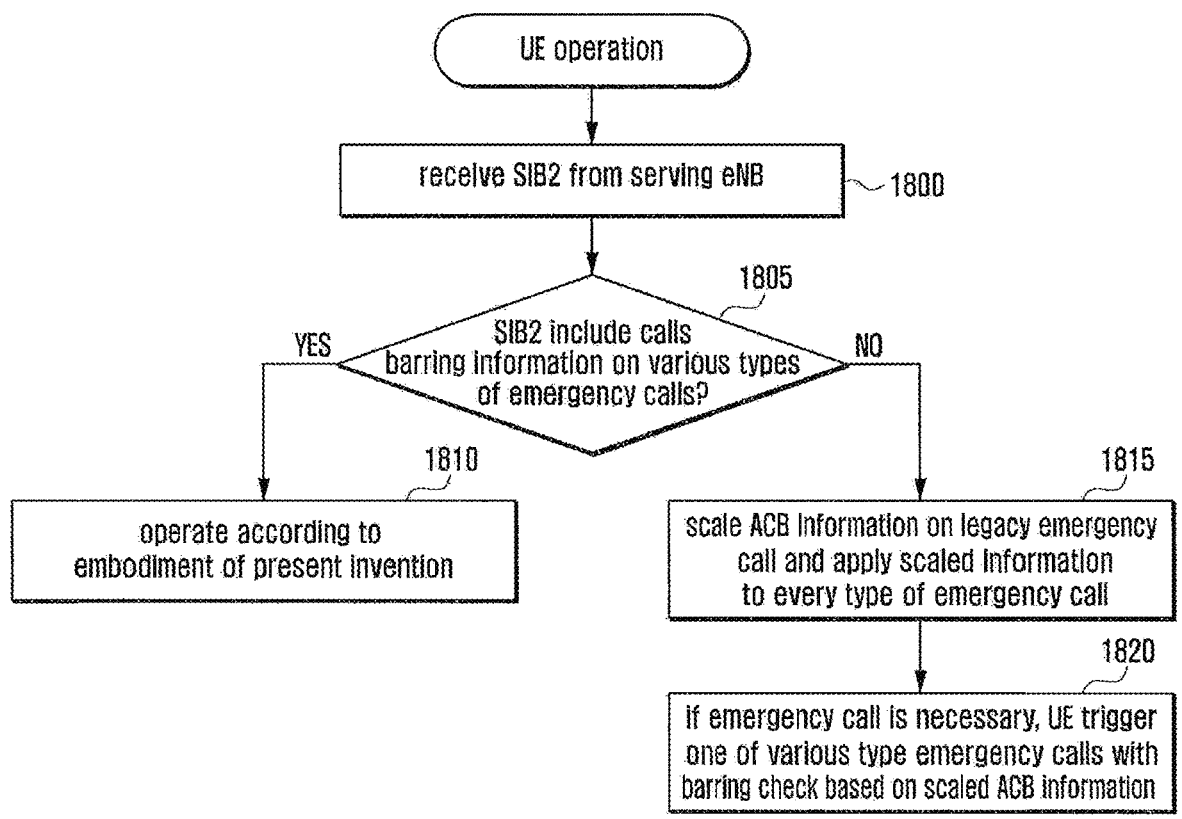
FIG. 18 illustrates an example of operations of a UE according to certain embodiments of this disclosure.

FIGS. 16, 17, and 18 are flowchart illustrating the operations of the UE supporting enhanced multiple emergency call types in connection with the legacy eNB. According to this embodiment, three UE operations are proposed. In this embodiment, the UE may include the UE AS and UE NAS.

The first UE operation is described with reference to FIG. 16. Referring to FIG. 16, the UE receives SIB2 broadcast by the serving eNB at step 1600. The system information includes the barring information.

The UE determines whether the SIB2 includes the barring information proposed in the present invention at step 1605. If the SIB2 does not include the barring information proposed in the present invention, the eNB is the legacy eNB which does not support multiple emergency call types. If the SIB2 includes the barring information, the UE performs the above-described UE operation at step 1610. If the eNB is the legacy eNB, the UE applies the ACB information on the legacy emergency call to the voice type emergency call at step 1615. As described above, the legacy ACB information, i.e. ac-BarringForEmergency IE, is sent to the UE in SIB2 too.

If it is necessary to request for an emergency call, the UE triggers the voice type emergency call only and performs the barring check in compliance with the legacy ACB operation at step 1620.

The second UE operation is described with reference to FIG. 17. Referring to FIG. 17, the UE receives the SIB2 broadcast by the serving eNB at step 1700. The system information includes the barring information.

The UE determines whether the SIB2 includes the barring information proposed in the present invention at step 1705. If the barring information is included, the UE perform the above-described operation at step 1710.

If the eNB is a legacy eNB, the UE applies the ACB information on the legacy emergency call to all the types of emergency calls at step 1715.

If it is necessary to request for an emergency call, the UE triggers one of the various types of emergency calls and performs the barring check in compliance with the legacy ACB operation at step 1720.

The last UE operation is described with reference to FIG. 18. Referring to FIG. 18, the UE receives the SIB2 broadcast by the serving eNB at step 1800. The system information includes the barring information. The UE determines whether the SIB2 includes the barring information proposed in the present invention at step 1805. If the barring information is included, the UE performs the above-described operation at step 1810.

If the eNB is a legacy eNB, the UE performs scaling on the ACB information of the legacy emergency call and applies the scaled ACB information to the respective types of emergency calls at step 1815. Here, scaling means modifying the legacy ACB information according to a predetermined rule. For example, if the legacy ACB information allows for the legacy emergency call access, it is regarded that the SMS and voice type emergency calls are allowed for access with the exception of the video type emergency call. Such a scaling-based method is used to allow for only the emergency call type causing influence equal to or less than that which the legacy emergency call access causes to the radio network.

If it is necessary to request for an emergency call, the UE triggers one of the various types of emergency calls and performs the barring check based on the scaled ACB information at step 1820.

Embodiment 2

Embodiment 2 proposes a method for providing ACB information to the MTC device. Hereinafter, the ACB information for MTC device is referred to as EAB information. The MTC device communication service is delay-tolerant and thus assigned a priority lower than that of the normal UE communication service. Accordingly, in the situation where the network load increases, the access barring may be applied to the MTC device communication service first as compared to the normal UE communication service.

The EAB information is not applicable to the normal UE but MTC device. As described with reference to FIG. 2, it is not preferred to apply the modification period to the MTC device to which the EAB information has to be delivered promptly. Accordingly, The MTC device performs a distinguished operation to receive SIB14 carrying EAB information. Prior to starting explanation of the embodiment, a procedure of receiving SIB14 is described.

Figure 10:
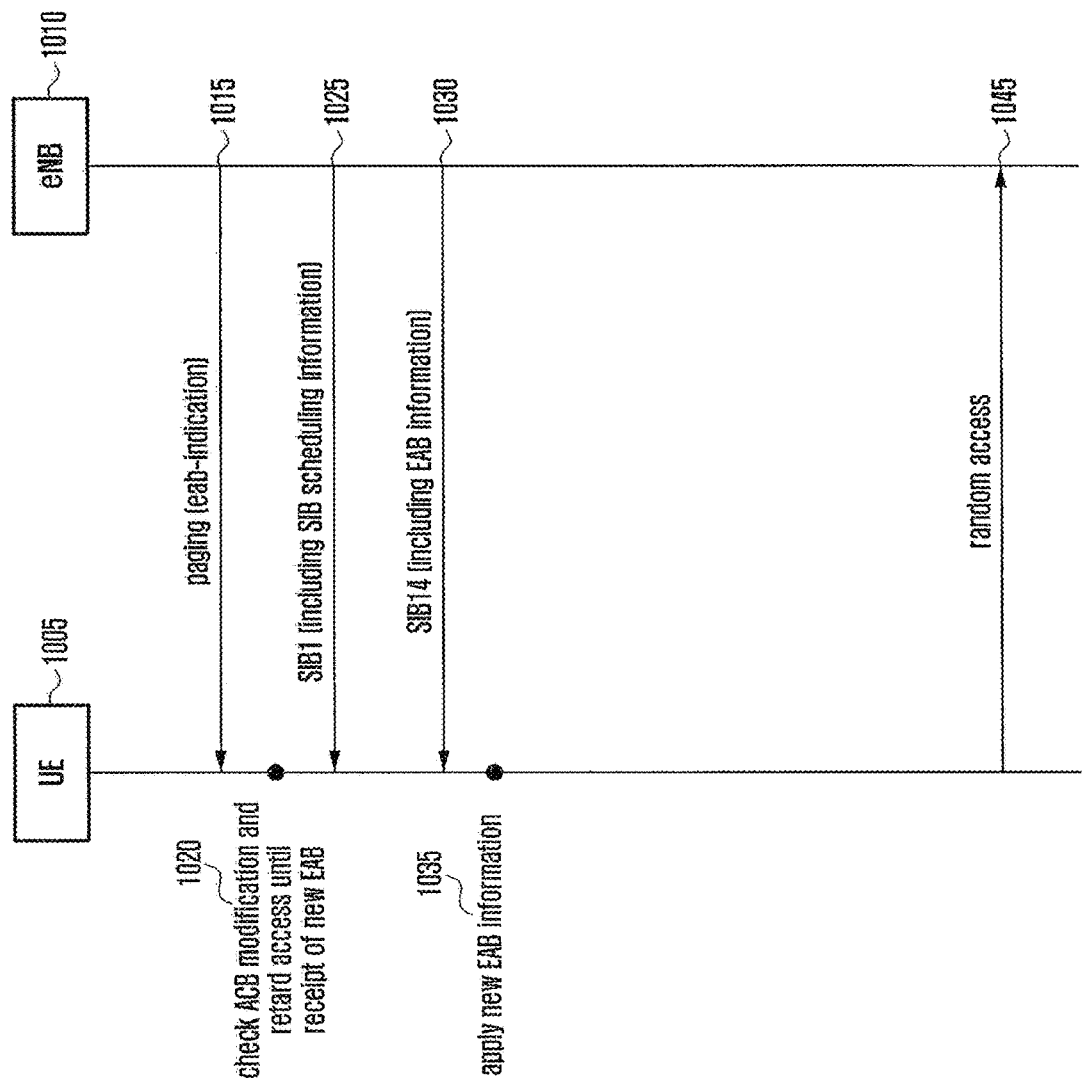
FIG. 10 is a signal flow diagram illustrating the EAB information acquisition procedure.

FIG. 10 is a signal flow diagram illustrating the EAB information acquisition procedure.

Although the description is directed to the MTC device, the present invention is not limited thereto but may be embodied by applying all the types of UEs having communication capability.

Referring to FIG. 10, if it is determined to control the initial attach of the MTC device 1005 due to the increase of the radio network load, the eNB 1010 sends the UE 1005 the paging message including an eab-indication IE at step 1015. According to an embodiment, the eab-indication IE is used to notify the UE 1005 of the modification of EAB information.

If the eab-indication is received, the UE 1005 retards the access at step 1020 until new EAB information is received. In order to acquire new EAB information, the UE 1005 receives SIB1 from the eNB 1010 at step 1025. The SIB1 may include SIB scheduling information.

The UE 1005 receives SIB14 include the EAB information based on the scheduling information at step 1030.

The UE 1005 may apply the newly acquired EAB information at step 1035. Afterward, the UE 1005 may attempt initial attach at step 1045.

Figure 11:
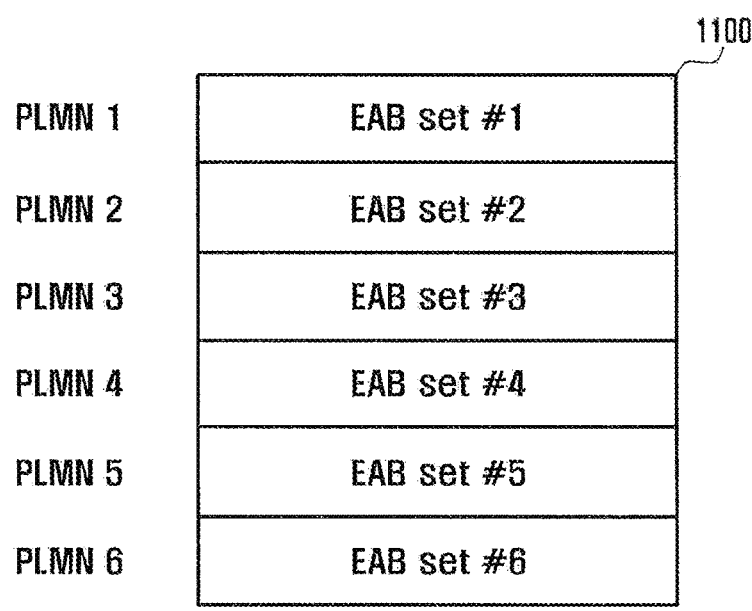
FIG. 11 is a diagram illustrating configurations of EAB information included in SIB 14.
Figure 11:
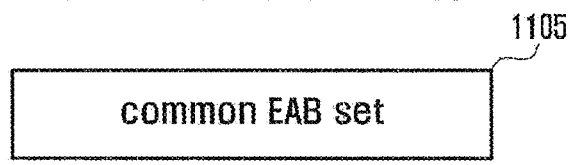

FIG. 11 is a diagram illustrating configurations of EAB information included in SIB 14.

Referring to FIG. 11, a cell may be shared several operators. Public Land Mobile Network (PLMN) denotes a network operated with a network name. The operators may provide services of a plurality networks within one cell or share one cell for the operator networks, i.e. PLMNs. One cell can serve up to 6 PLMNs, and a list of the PLMNs is broadcast in the SIB1 of the corresponding cell.

In the case that one cell is shared by several operators, there may be MTC devices registered with the operators within the cell. In the case that traffic load increases in the network of a certain operator, it is necessary to restrict the access of the MTC devices using the corresponding operator network selectively. Accordingly, if the EAB information is provided per PLMN, this may facilitate such control. An embodiment of the present invention proposes a method of configuring per-PLMN EAB information efficiently.

An EAB set 1100 consists of 10 bits of which each bit indicates whether a specific class is allowed for access. That is, every UE has a class selected in the range of 0 to 9, and the 10-bit information indicates whether the respective classes are allowed for access. If each bit is set to 0 to indicate access restriction or 1 to indicate access allowance for the corresponding class. The EAB information may be different from or identical with the ACB information made up of the barring factor and barring time information as described above. It is also possible to transmit the per-PLMN barring factors and barring times according to an embodiment.

The number of EAB sets is equal to the number of PLMNs listed in the PLMN list carried in the SIB1. That is, if the PLMN list includes 6 PLMNs, total 6 EAB sets exist. It is necessary to map the PLMNs in the PLMN list to the EAB sets as exemplified in such a way of mapping in the order of arrangement in the present invention. For example, if the PLMNs are contained in the PLMN list of SIB1 like {PLMN 1, PLMN 2, PLMN 3, PLMN 4, PLMN 5, PLMN 6}, the EAB sets 1, 2, 3, 4, and 5 contained in SIB14 may correspond to PLMN 1, PLMN 2, PLMN 3, PLMN 4, PLMN 5, and PLMN 6 respectively.

In an embodiment, if the PLMNs of the PLMN list have the same EAB set for optimization, only one EAB set is carried in SIB14. After receiving both the SIB1 and SIB14, if the SIB14 includes only one EAB set 1105 independently of the number of PLMNs included in the PLMN list of SIB1, the UE may apply the corresponding EAB set to all the PLMNs.

Figure 12:
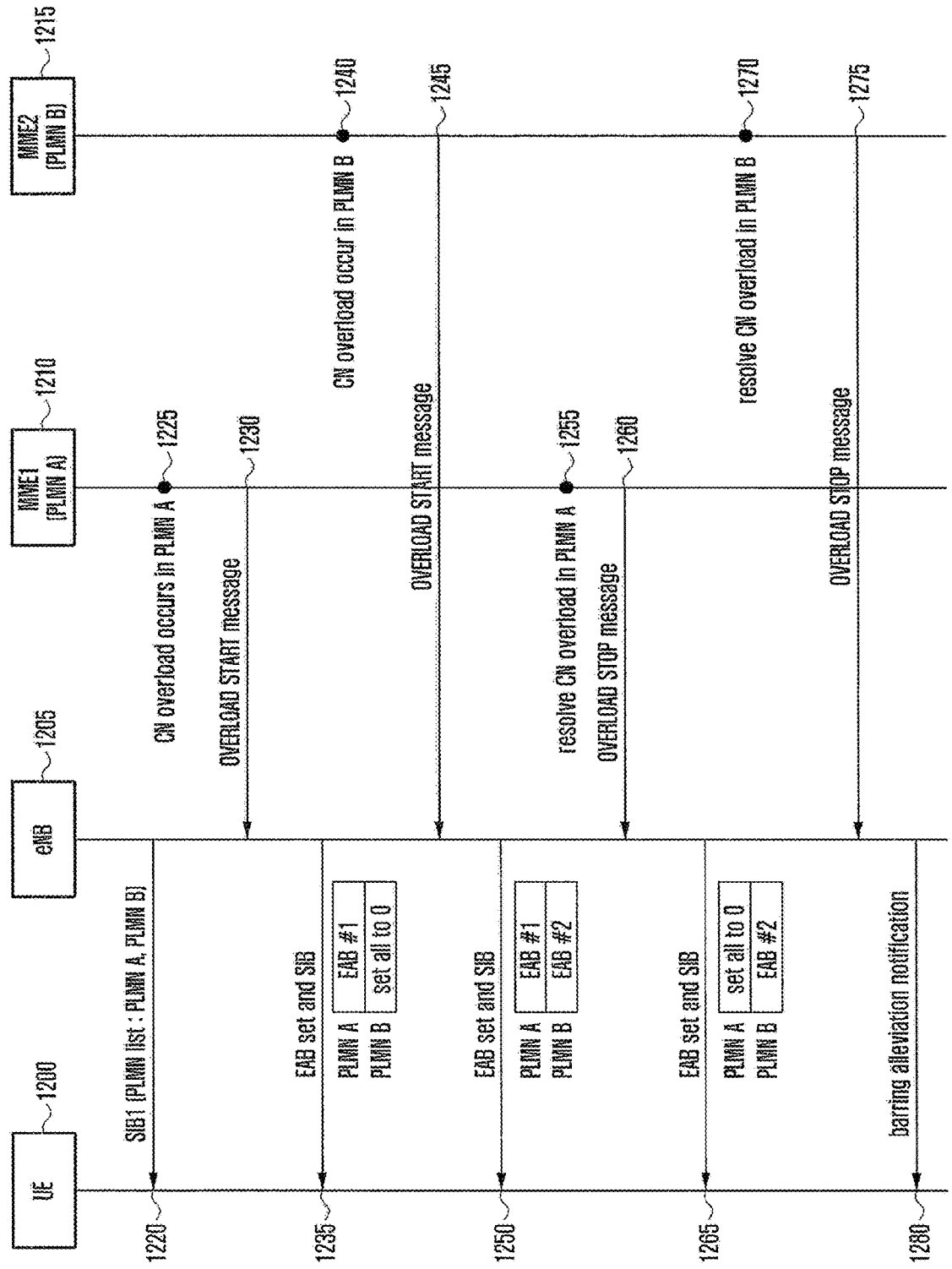
FIG. 12 is a signal flow diagram illustrating a procedure of providing multiple EABs in the system overload situation.

FIG. 12 is a signal flow diagram illustrating a procedure of providing multiple EABs in the system overload situation.

Referring to FIG. 12, the eNB 1205 may provide the UE 1200 with a list of PLMNs available for service through SIB1 at step 1220. The eNB 1205 is shared by the PLMNs A and B. Other PLMNs not shown in the drawings may share the eNB 1205 too.

The MME1 1210 belonging to the PLMN A detects a CN overload situation at step 1225.

The MME1 1210 notifies the eNB 1205 of the CN overload situation and overload level through an OVERLOAD START message. The overload may be reported using various types of message depending on the embodiment.

The eNB 1205 may configure an EAB for the PLMN A in consideration of the CN overload level and send the EAB to the UE 1200 at step 1235. In this embodiment, since the PLMN B is not in a CN overload situation, the eNB 1205 sends the UE 1200 the EAB for the PLMN B of which every bit is set to 0.

The UE 1205 receives the EAB set and determines whether its access is barred in consideration of its AC.

The MME2 1215 belonging to the PLMN B detects the CN overload situation at step 1240

The MME2 1215 notifies the eNB of the CN overload situation and overload level through the OVERLOAD START message at step 1245.

The eNB 1205 may configure an EAB for the PLMN B in consideration of the CN overload level and send the EAB to the UE 1200 at step 1250. Since the PLMN A is in the CN overload situation yet, the EAB set for the PLMN A is provided together. The UE 1200 receives an EAB set and determines whether the access is barred in consideration of its AC.

The MME1 1210 belonging to the PLMN A detects that the CN overload situation is resolved at step 1225.

The MME1 1210 notifies the eNB 1205 of the resolution of CN overload situation through an OVERLOAD STOP message at step 1260. Various types of message may be used to notify of the overload resolution. The overload may be reported using various types of message depending on the embodiment.

The eNB 1205 may configure an EAB set of the PLMN A of which all bits are set to 0 in consideration of the CN overload level of the PLMN A and transmits the EAB set to the UE 1200 at step 1265. Since the PLMN B is in the CN overload situation yet, the EAB set for the PLMN B is provided constantly. The UE 1200 receives the EAB set and determines whether the access is barred in consideration of its AC.

The MME2 1215 belonging to the PLMN B detects the CN overload situation is resolved at step 1270.

The MME2 1215 notifies the eNB 1205 of the resolution of CN overload situation through the OVERLOAD STOP message at step 1275.

If the CN overload is resolved for all the PLMNs, the eNB 1205 determines that it is not necessary to provide EAB any longer at step 1280. The UE 1200 may check this situation through SIB update procedure and, if no EAB is received, release the access barring.

Figure 13:
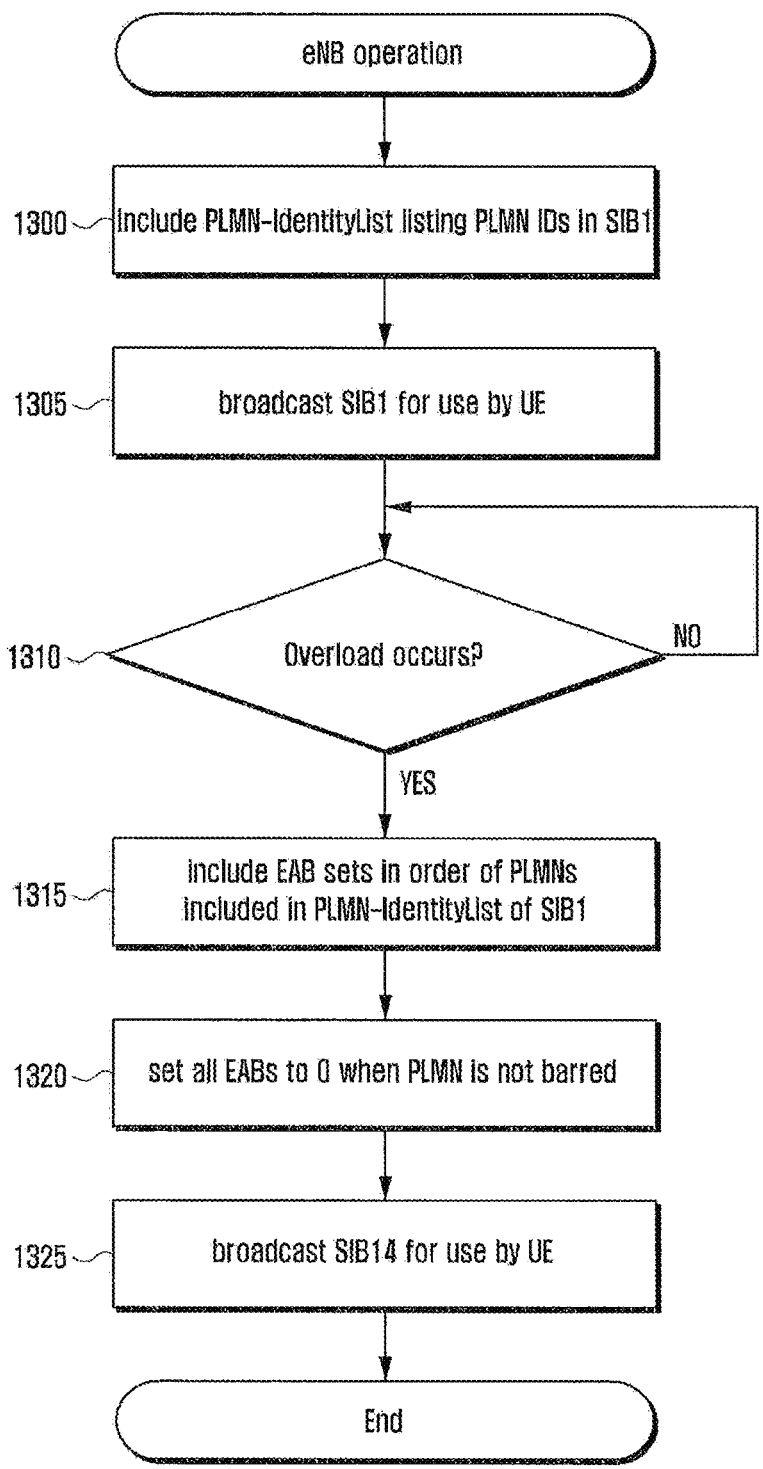
FIG. 13 is a flowchart illustrating the eNB operation.

FIG. 13 is a flowchart illustrating the eNB operation.

Referring to FIG. 13, the eNB creates SIB1 including the PLMN list listing n (up to 6) PLMN IDs at step 1300.

The eNB broadcasts the SIB1 for use by the UE at step 1305.

The eNB determines whether the network is in the overload state at step 1310.

The eNB includes in the SIB1 the per-PLMN EAB sets in consideration of the arranged order of the PLMNs in the PLMN list and the arranged order of the PLMN-specific EAB sets.

The eNB sets the EAB sets for the PLMNs to which EAB is not applied to 0 at step 1320.

The eNB broadcasts the SIB14 for use by the UE at step 1325.

Figure 14:
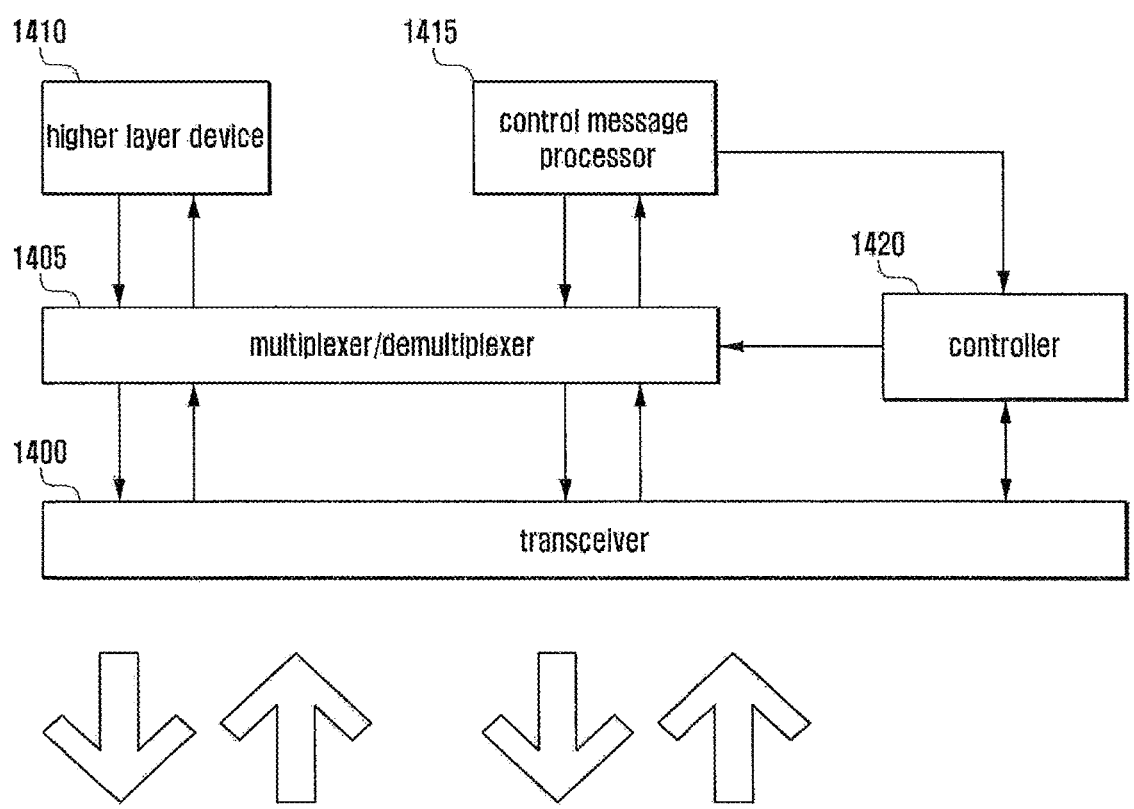
FIG. 14 is a block diagram illustrating a configuration of the UE according to an embodiment of the present invention.

FIG. 14 is a block diagram illustrating a configuration of the UE according to an embodiment of the present invention.

Referring to FIG. 14, the UE includes a higher layer device 1410 generating data and a control message processor 1415 for processing control message. The UE multiplexes the control signals and data to be transmitted to the eNB by means of the multiplexor/demultiplexer 1405 and transmits the multiplexed data by means of the transceiver 1400 under the control of the controller 1420. The UE receives a physical signal by means of the transceiver 1400, demultiplexes the received signal, and delivers the demultiplexed signal to the higher layer device 1410 or the control message processor 1415 under the control of the controller 1420.

Figure 15:
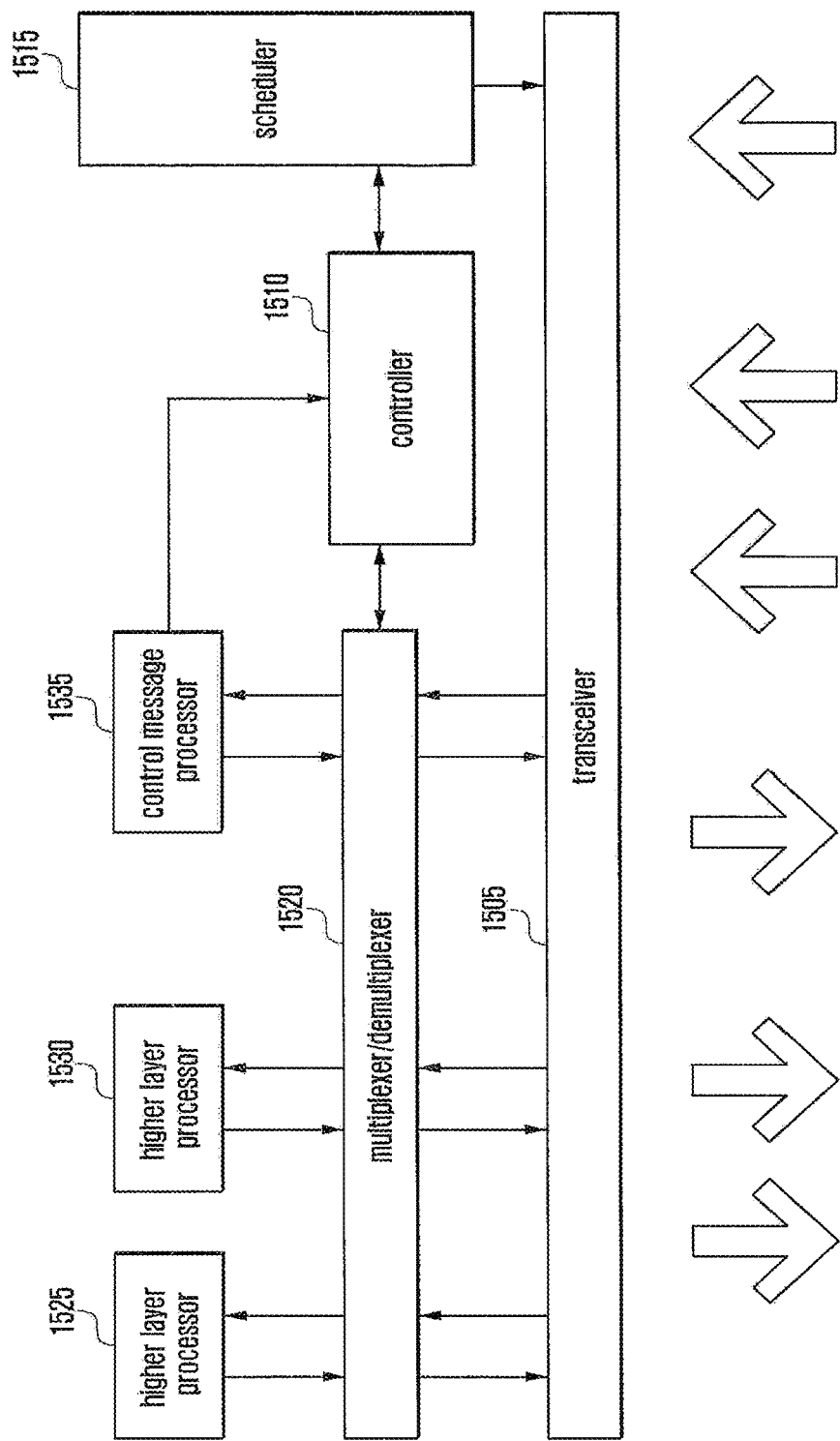
FIG. 15 is a block diagram illustrating a configuration of the eNB according to an embodiment of the present invention.

FIG. 15 is a block diagram illustrating a configuration of the eNB according to an embodiment of the present invention.

Referring to FIG. 15, the eNB includes a transceiver 1505, a controller 1510, a multiplexer/demultiplexer 1520, a control message processor 1535, various higher layer processors 1525 and 1530, and a scheduler 1515. The transceiver transmits data and control signals on a downlink carrier and receives data and control single on an uplink carrier. In the case that a plurality of carriers is configured, the transceiver 1505 may transmit and receive data and signals on the plural carriers. The multiplexer/demultiplexer 1520 multiplexes the data generated by the higher layer processors 1525 and the control message processor 1535 or demultiplexes the data received by the transceiver 1505 and deliver the demultiplexed signals to the corresponding higher layer processors 1525 and 1530, the control message processor 1535, and/or the controller 1510. The control unit 1510 determines whether to include the control configuration information in the control message. The control message processor 1535 generates a control message to be transmitted to the UE and sends the generated message to the higher layer under the control of the controller 1510. The higher layer processors 1525 and 1530 may be configured per UE per service to process the data generated by the user service such as FTP and VoIP and transfers the processed data to the multiplexer/demultiplexer 1520 or processes the data from the multiplexer/demultiplexer 1520 and delivers the processed data to the service applications of the higher layer. The scheduler 1515 allocates transmission resource to the UE at an appropriate time point and in consideration of the buffer state, channel state, and active time of the UE and controls the transceiver to process the signal transmitted by the UE or transmit signals to the UE.

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A method performed by a terminal in a communication system, the method comprising:
   obtaining a list of one or more public land mobile networks (PLMNs) and a list of one or more barring configurations, wherein each of the one or more barring configurations is configured per PLMN;
   identifying a barring configuration for a PLMN based on the list of the one or more PLMNs and the list of the one or more barring configurations;
   identifying a barring parameter including at least one of a barring factor or a barring time based on the barring configuration for the PLMN and a type of an access attempt; and
   performing an access barring check for the access attempt based on the barring parameter,
   wherein each of the one or more barring configurations corresponds to one or more barring parameters,
   wherein each of the one or more barring parameters is configured per type of an access attempt,
   wherein whether the access attempt is allowed is determined based on the barring parameter,
   wherein, in case that a first value randomly selected between 0 and 1 is lower than a second value indicated by the barring factor, the access attempt is allowed, and
   wherein, in case that the first value is greater than the second value, the access attempt is barred.

2. The method of claim 1, wherein the access attempt is for at least one of an emergency call, a voice call, a video call, or a short message service (SMS) call.

3. The method of claim 1, further comprising:
   obtaining a common barring configuration for the one or more PLMNs,
   wherein each of one or more barring parameters corresponding to the common barring configuration is configured per type of an access attempt, and
   wherein the one or more barring parameters corresponding to the common barring configuration are used for the one or more PLMNs.

4. The method of claim 1, wherein the list of the one or more PLMNs and the list of the one or more barring configurations are received from a base station via a system information block.

5. A method performed by a base station in a communication system, the method comprising:
   transmitting, to a terminal, information on a list of one or more public land mobile networks (PLMNs) and information on a list of one or more barring configurations,
   wherein each of the one or more barring configurations is configured per PLMN,
   wherein each of the one or more barring configurations corresponds to one or more barring parameters,
   wherein each of the one or more barring parameters is configured per type of an access attempt,
   wherein a barring configuration for a PLMN is identified based on the list of the one or more PLMNs and the list of the one or more barring configurations,
   wherein a barring parameter including at least one of a barring factor or a barring time is identified based on the barring configuration for the PLMN and a type of an access attempt,
   wherein an access barring check for the access attempt is performed based on the barring parameter,
   wherein whether the access attempt is allowed is determined based on the barring parameter,
   wherein, in case that a first value randomly selected between 0 and 1 is lower than a second value indicated by the barring factor, the access attempt is allowed, and
   wherein, in case that the first value is greater than the second value, the access attempt is barred.

6. The method of claim 5, wherein the access attempt is for at least one of an emergency call, a voice call, a video call, or a short message service (SMS) call.

7. The method of claim 5, further comprising:
   transmitting, to the terminal, information on a common barring configuration for the one or more PLMNs,
   wherein each of one or more barring parameters corresponding to the common barring configuration is configured per type of an access attempt, and
   wherein the one or more barring parameters corresponding to the common barring configuration are used for the one or more PLMNs.

8. The method of claim 5, wherein the list of the one or more PLMNs and the list of the one or more barring configurations are transmitted via a system information block.

9. A terminal in a communication system, the terminal comprising:
   a transceiver; and
   a controller coupled with the transceiver and configured to:
   obtain a list of one or more public land mobile networks (PLMNs) and a list of one or more barring configurations, wherein each of the one or more barring configurations is configured per PLMN, identify a barring configuration for a PLMN based on the list of the one or more PLMNs and the list of the one or more barring configurations, identify a barring parameter including at least one of a barring factor or a barring time based on the barring configuration for the PLMN and a type of an access attempt, and perform an access barring check for the access attempt based on the barring parameter, wherein each of the one or more barring configurations corresponds to one or more barring parameters, wherein each of the one or more barring parameters is configured per type of an access attempt, wherein whether the access attempt is allowed is determined based on the barring parameter, wherein, in case that a first value randomly selected between 0 and 1 is lower than a second value indicated by the barring factor, the access attempt is allowed, and wherein, in case that the first value is greater than the second value, the access attempt is barred.

10. The terminal of claim 9, wherein the access attempt is for at least one of an emergency call, a voice call, a video call, or a short message service (SMS) call.

11. The terminal of claim 9, wherein the controller is further configured to:

obtain a common barring configuration for the one or more PLMNs, wherein each of one or more barring parameters corresponding to the common barring configuration is configured per type of an access attempt, and wherein the one or more barring parameters corresponding to the common barring configuration are used for the one or more PLMNs.

12. The terminal of claim 9, wherein the list of the one or more PLMNs and the list of the one or more barring configurations are received from a base station via a system information block.

13. A base station in a communication system, the base station comprising:

a transceiver; and a controller coupled with the transceiver and configured to:

transmit, to a terminal, information on a list of one or more public land mobile networks (PLMNs) and information on a list of one or more barring configurations, wherein each of the one or more barring configurations is configured per PLMN, wherein each of the one or more barring configurations corresponds to one or more barring parameters, wherein each of the one or more barring parameters is configured per type of an access attempt, wherein a barring configuration for a PLMN is identified based on the list of the one or more PLMNs and the list of the one or more barring configurations, wherein a barring parameter including at least one of a barring factor or a barring time is identified based on the barring configuration for the PLMN and a type of an access attempt, wherein an access barring check for the access attempt is performed based on the barring parameter, wherein whether the access attempt is allowed is determined based on the barring parameter, wherein, in case that a first value randomly selected between 0 and 1 is lower than a second value indicated by the barring factor, the access attempt is allowed, and wherein, in case that the first value is greater than the second value, the access attempt is barred.

14. The base station of claim 13, wherein the access attempt is for at least one of an emergency call, a voice call, a video call, or a short message service (SMS) call.

15. The base station of claim 13, wherein the controller is further configured to:

transmit, to the terminal, information on a common barring configuration for the one or more PLMNs, wherein each of one or more barring parameters corresponding to the common barring configuration is configured per type of an access attempt, and wherein the one or more barring parameters corresponding to the common barring configuration are used for the one or more PLMNs.

16. The base station of claim 13, wherein the list of the one or more PLMNs and the list of the one or more barring configurations are transmitted via a system information block.

* * * * *